US009668256B2

(12) United States Patent
Koyanagi et al.

(10) Patent No.: US 9,668,256 B2
(45) Date of Patent: *May 30, 2017

(54) RESOURCE ALLOCATION METHOD, IDENTIFICATION METHOD, RADIO COMMUNICATION SYSTEM, BASE STATION, MOBILE STATION, AND PROGRAM

(71) Applicant: NEC CORPORATION, Tokyo (JP)

(72) Inventors: Kenji Koyanagi, Tokyo (JP); Takamichi Inoue, Tokyo (JP); Le Liu, Tokyo (JP); Yoshikazu Kakura, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,569

(22) Filed: Apr. 19, 2016

(65) Prior Publication Data

US 2016/0234817 A1   Aug. 11, 2016

Related U.S. Application Data

(63) Continuation of application No. 13/000,301, filed as application No. PCT/JP2009/061194 on Jun. 19, 2009, now Pat. No. 9,350,485.

(30) Foreign Application Priority Data

Jun. 20, 2008   (JP) .................................. 2008-161752

(51) Int. Cl.
*H04W 72/04* (2009.01)
*H04L 5/00* (2006.01)
*H04L 1/00* (2006.01)

(52) U.S. Cl.
CPC ......... *H04W 72/042* (2013.01); *H04L 1/0029* (2013.01); *H04L 5/006* (2013.01);
(Continued)

(58) Field of Classification Search
CPC ........... H04W 72/042; H04W 72/0406; H04W 72/0413; H04W 72/0446
See application file for complete search history.

(56) References Cited

U.S. PATENT DOCUMENTS

2008/0049813 A1* 2/2008 Kurose ................. H04L 1/0016
375/141
2008/0101214 A1* 5/2008 Jitsukawa ............. H04L 5/0044
370/208

(Continued)

OTHER PUBLICATIONS

Communication dated Jul. 25, 2014, issued by the European Patent Office in counterpart European application No. 09766718.2.
(Continued)

Primary Examiner — Jamal Javaid
(74) Attorney, Agent, or Firm — Sughrue Mion, PLLC

(57) ABSTRACT

To solve a problem that although the increase of the number of frequency blocks by allocating discontinuous subcarriers (RBs) as in OFDM enables an increase in multi-diversity effect and an improvement in throughput, the number of RB allocation patterns increases with the increase of the number of frequency blocks, resulting in an increase in the amount of information relating to the allocated RBs, the resource block allocation unit is determined when resource blocks discontinuous on the frequency axis are allocated to a terminal, and the number of bits of scheduling information indicating the allocated resource blocks by using Tree Based is set to the number of bits corresponding to the determined allocation unit.

20 Claims, 19 Drawing Sheets

(52) U.S. Cl.
CPC .......... *H04L 5/0041* (2013.01); *H04L 5/0064* (2013.01); *H04L 5/0092* (2013.01); *H04L 5/0094* (2013.01)

(56) References Cited

U.S. PATENT DOCUMENTS

| | | | |
|---|---|---|---|
| 2008/0117867 A1 | 5/2008 | Yin et al. | |
| 2008/0139237 A1 | 6/2008 | Papaskellaroiu | |
| 2008/0233992 A1* | 9/2008 | Oteri | H04W 52/241 |
| | | | 455/522 |
| 2010/0103890 A1 | 4/2010 | Ishii et al. | |
| 2011/0065468 A1 | 3/2011 | Parkvall et al. | |

OTHER PUBLICATIONS

NEC Group and NTT DoCoMo, Uplink Resource Allocation for E-UTRA R1-073457, TSG-RAN WG1 #50, pp. 1-5, Aug. 20, 2007.

NEC Group and NTT DoCoMo, Uplink Resource Allocation for E-UTRA, R1-070881, TSG-RAN WG1 #48, pp. 1-4, Feb. 12, 2007.

NEC Group, "DL Distributed Resource Signalling for EUTRA", 3GPP Draft; R1-072826, 3rd Generation Partnership project (3GPP), vol. RAN WG1, Jun. 20, 2007.

NEC Group, "DL Unicast Resource Allocation Signalling using L1L2 control channels", 3GPP Draft; R1-074715, 3rd Generation Partnership project (3GPP), vol. RAN WG1, Oct. 30, 2007.

NEC Group, "Signalling discontinuous localised allocations in E-UTRA downlink", 3GPP Draft; R1-070882, 3rd Generation Partnership project (3GPP), vol. RAN WG1, Feb. 6, 2007.

NEC Group, DL Unicast Resource Allocation Signalling Using L1L2 Control Channels, R1-072832, TSG-RAN WG1 #49bis, pp. 1-6, Jun. 25, 2007.

NEC Group, DL Unicast Resource Allocation Signalling Using L1L2 Control Channels, R1-075055, TSG-RAN WG1 #51, pp. 1-4, Nov. 5, 2007.

* cited by examiner

| FREQUENCY BLOCK | 1 | 2 | 3 |
|---|---|---|---|
| ALLOCATION RESOLUTION | 1RB | 1RB | 2RBS |

FIG. 9
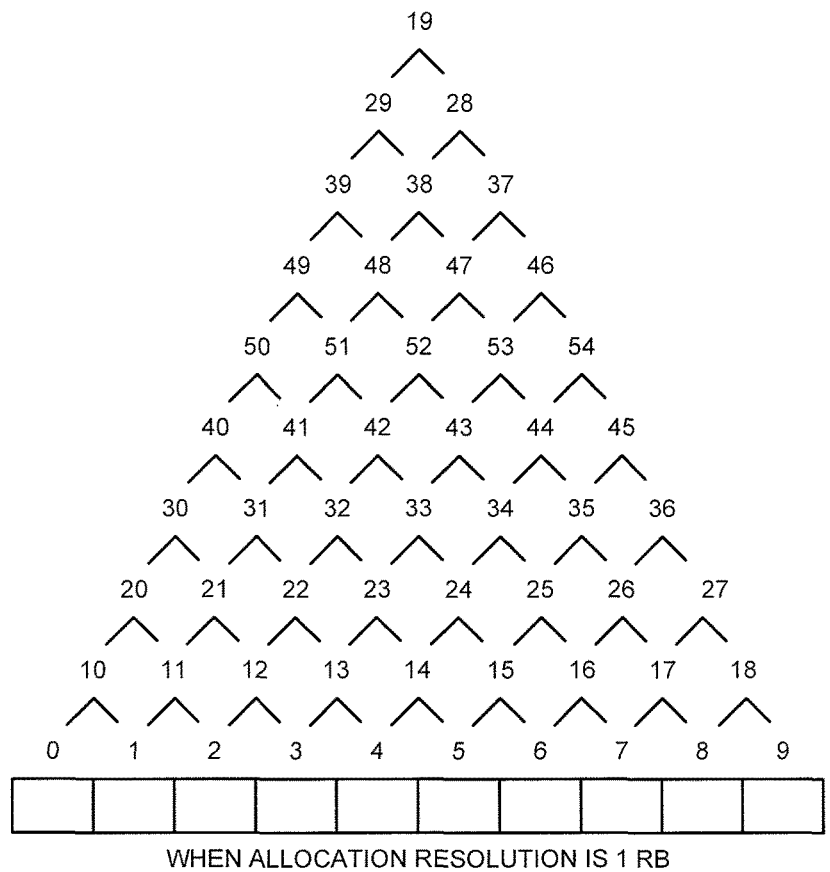
WHEN ALLOCATION RESOLUTION IS 1 RB
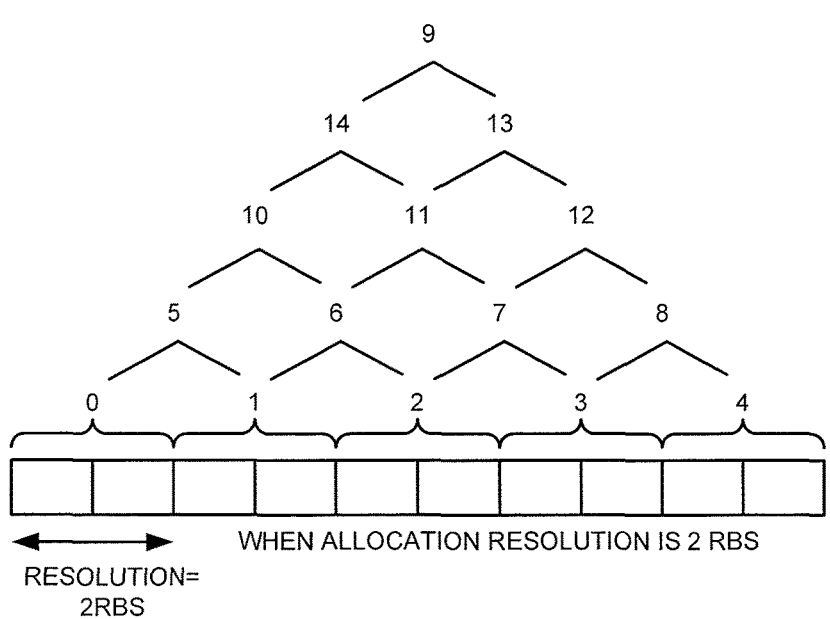
WHEN ALLOCATION RESOLUTION IS 2 RBS
RESOLUTION= 2RBS

FIG. 11

| DF (FREQUENCY BLOCK) | 1 | 2 | 3 | 4 |
|---|---|---|---|---|
| ALLOCATION RESOLUTION | 1RB | 1RB | 2RBS | 5RBS |
| NUMBER OF BITS OF INFORMATION REQUIRED FOR NOTIFICATION PER FREQUENCY BLOCK ACCORDING TO TREE-BASED METHOD | 13 | 13 | 11 | 8 |
| NUMBER OF BITS OF INFORMATION REQUIRED FOR NOTIFICATION OF MAXIMUM OF DF FREQUENCY BLOCKS ACCORDING TO TREE-BASED METHOD | 15(=13x1+2) | 28(=13x2+2) | 35(11x3+2) | 34(8x4+2) |

RESOLUTION=2RBS

RESOURCE ALLOCATION METHOD, IDENTIFICATION METHOD, RADIO COMMUNICATION SYSTEM, BASE STATION, MOBILE STATION, AND PROGRAM

CROSS-REFERENCE TO RELATED APPLICATIONS

This application is a Continuation of U.S. application Ser. No. 13/000,301, filed Dec. 20, 2010, which is a 371 of International Application No. PCT/JP2009/061194 filed Jun. 19, 2009, claiming priority based on Japanese Patent Application No. 2008-161752 filed Jun. 20, 2008, the contents of all of which are hereby incorporated by reference in their entirety.

TECHNICAL FIELD

The present invention relates to a technique for notifying resource allocation information in scheduling.

BACKGROUND ART

For uplink according to LTE (Long Term Evolution) in 3GPP (3rd Generation Partnership Project), an SC (single-carrier)-FDMA (Frequency Division Multiple Access) scheme is adopted for a wireless access scheme to avoid an increase in PAPR (Peak to Average Power Ratio) and achieve wide coverage. According to SC-FDMA, only one frequency block can be allocated per mobile station within one Transmit Time Interval (TTI), where a frequency block is composed of resource blocks (each composed of a plurality of sub-carriers) that are consecutive on the frequency axis. When the number of frequency blocks is thus small, a Tree-Based (see Non-patent Document 1) method can minimize the amount of information on resource allocation. Accordingly, the Tree-Based method is employed in notification of uplink resource allocation information (Uplink Scheduling Grant) in scheduling for LTE uplink.

Non-patent Document 1: 3GPP R1-070881, NEC Group, NTT DoCoMo, "Uplink Resource Allocation for E-UTRA," February 2007.

DISCLOSURE OF THE INVENTION

Problems to be Solved by the Invention

In broadband wireless communications, influence of a plurality of delay paths causes frequency-selective phasing with which Channel Quality Indicator (CQI) varies on the frequency axis. Moreover, when considering multiple access in which a base station communicates with a plurality of mobile stations, the mobile stations communicate with the base station in different environments, so that CQI in the frequency domain is different from mobile station to mobile station. From such a background, an attempt is made to improve throughput in LTE by scheduling (frequency domain channel dependent scheduling) comprising comparing CQI in the frequency domain among mobile stations, and allocating a sub-carrier with excellent CQI to each mobile station.

When making the frequency domain channel dependent scheduling in SC-FDMA, only one frequency block (frequency block: at least one or more resource blocks consecutive on the frequency axis) with good CQI is allocated to one mobile station within 1 TTI. On the other hand, by making discontinuous sub-carrier allocation to increase the number of frequency blocks as in OFDM (Orthogonal Frequency Division Multiplexing) adopted in an LTE downlink access scheme, an additional multi-diversity effect can be achieved to improve throughput. However, an increased number of frequency blocks may cause an increase of overhead due to notification of information on resource block allocation (Scheduling Grant).

In fact, adoption of a Bit Map method (a method suitable for a larger number of frequency blocks) is currently being studied in notification of resource block allocation information in LTE downlink (Downlink Scheduling Grant). The Bit Map method has a greater overhead than that in the Tree-Based method (a method suitable for a smaller number of frequency blocks) for use in notification of LTE uplink RB allocation information (Uplink Scheduling Grant). In particular, resource allocation of 100 RBs requires 100-bit scheduling information when using the Bit Map method regardless the number of frequency blocks.

On the other hand, when using the Tree-Based method, only $\log_2 100$ (100+1)/2=13-bit scheduling information is required for a number of frequency blocks of one; however, as the number of frequency blocks becomes larger, an amount of information multiplied by the number of frequency blocks is required, as compared with a case in which the number of frequency blocks is one. In particular, while the overhead in using the Tree-Based method for a number of frequency blocks=1 is 13 bits as described above, it increases up to 13×2=26 bits for a number of frequency blocks=2, and to 13×4=52 bits for a number of frequency blocks=4. As such, the number of RB allocation patterns is generally larger for an increased number of frequency blocks, and accordingly, the amount of information for Uplink Scheduling Grant becomes greater. Therefore, there is a problem that to enhance the effect of frequency scheduling, the signaling overhead increases relative to a smaller number of frequency blocks.

It is therefore a problem to be solved by the present invention is to provide a technique for avoiding the signaling overhead for scheduling information encountered in enhancing the effect of multi-user diversity.

Means for Solving the Problems

An aspect of the present invention for solving the aforementioned problem is a resource allocating method, characterized in comprising: determining an allocation resolution that is a unit of resource block allocation, when allocating at least one or more resource block groups including at least one or more resource blocks consecutive on a frequency axis to a terminal.

Another aspect of the present invention for solving the aforementioned problem is a scheduling information identifying method, characterized in comprising: identifying, from an allocation resolution that is a unit of resource block allocation, which is determined when allocating at least one or more resource block groups including at least one or more resource blocks consecutive on a frequency axis, the allocated resource blocks.

Still another aspect of the present invention for solving the aforementioned problem is a wireless system comprising: scheduling means for determining an allocation resolution that is a unit of resource block allocation, when allocating at least one or more resource block groups including at least one or more resource blocks consecutive on a frequency axis to a terminal.

Still another aspect of the present invention for solving the aforementioned problem is a base station, characterized in comprising: scheduling means for determining an allocation resolution that is a unit of resource block allocation, when allocating at least one or more resource block groups including at least one or more resource blocks consecutive on a frequency axis to a terminal.

Still another aspect of the present invention for solving the aforementioned problem is a mobile station comprising: identifying, from an allocation resolution that is a unit of resource block allocation, which is determined when allocating at least one or more resource block groups including at least one or more resource blocks consecutive on a frequency axis, the allocated resource blocks.

Still another aspect of the present invention for solving the aforementioned problem is a program for a base station, said program causing said base station to execute: determining processing of determining an allocation resolution that is a unit of resource block allocation, when allocating at least one or more resource block groups including at least one or more resource blocks consecutive on a frequency axis to a terminal.

Still another aspect of the present invention for solving the aforementioned problem is a program for a mobile station, said program causing said mobile station to execute: processing of identifying, from an allocation resolution that is a unit of resource block allocation, which is determined when allocating at least one or more resource block groups including at least one or more resource blocks consecutive on a frequency axis, the allocated resource blocks.

Effects of the Invention

According to the present invention, an allocation resolution suitable to circumstances is determined, a structure in the Tree-Based method is modified accordingly, and information on allocated RBs is represented using the Tree-Based method; therefore, an increase of the amount of signaling with an increase of the number of frequency blocks can be prevented.

BRIEF DESCRIPTION OF THE DRAWINGS

FIG. 9 A diagram for explaining the Tree-Based method modified according to an allocation resolution.

FIG. 11 A diagram showing the number of bits of resource allocation information with respect to the maximum frequency blocks and allocation resolution.

EXPLANATION OF SYMBOLS

Figure 1:
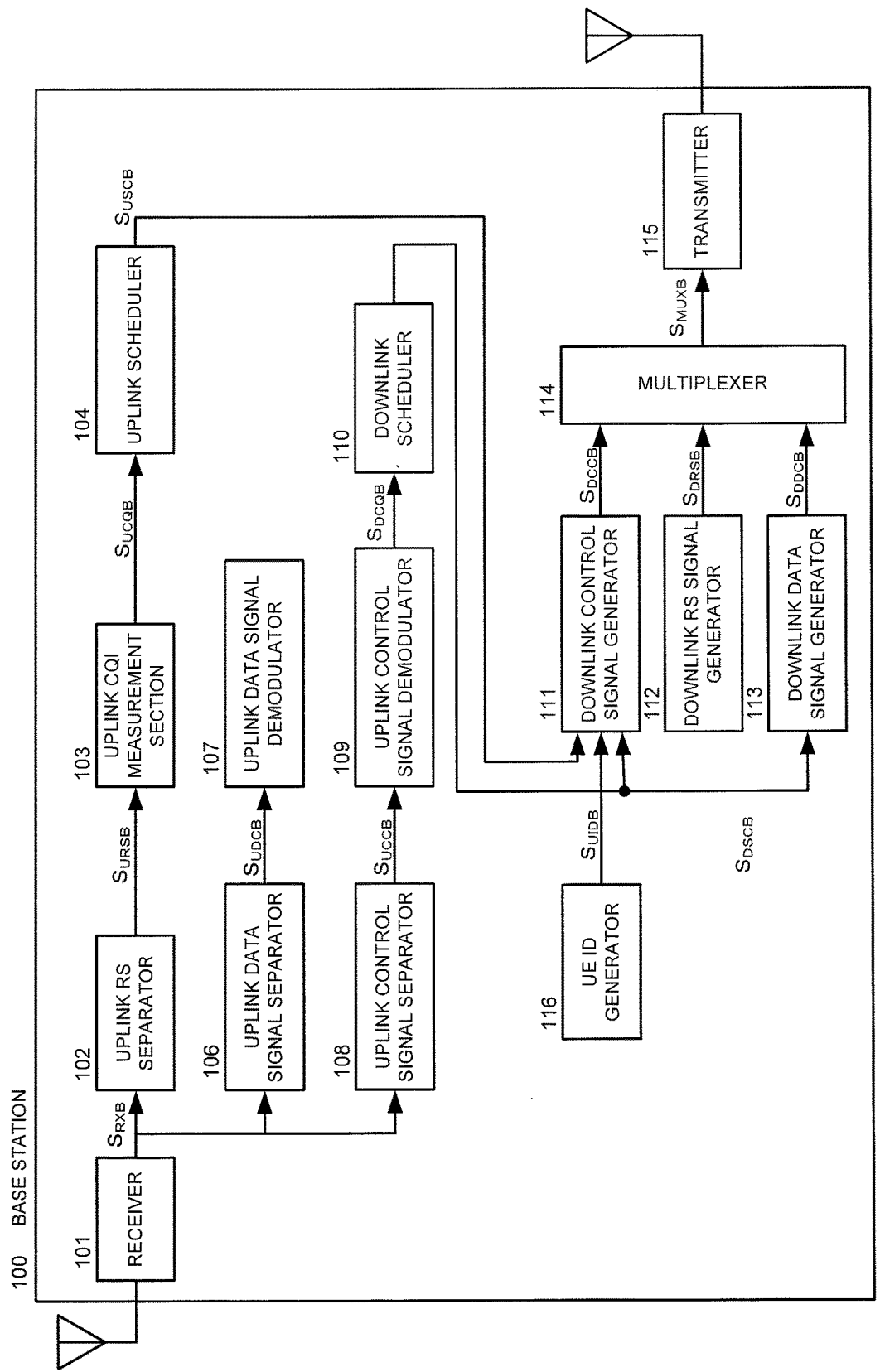
FIG. 1 A block diagram of a base station in a wireless communication system in a first embodiment.

100 Base station
101 Receiver
102 Uplink RS separator
103 Uplink CQI measurement section
104 Uplink scheduler
105 Maximum-number-of-frequency-blocks determining section
106 Uplink data signal separator
107 Uplink data signal demodulator
108 Uplink control signal separator
109 Uplink control signal demodulator
110 Downlink scheduler
111 Downlink control signal generator
112 Downlink RS signal generator
113 Downlink data signal generator
114 Multiplexer
115 Transmitter
116 UE ID generator
200 Mobile station
201 Receiver
202 Downlink RS separator
203 Downlink CQI measurement section
204 Downlink data signal separator
205 Downlink data signal demodulator
206 Downlink control signal separator
207 Downlink control signal demodulator
208 Downlink scheduling information extracting section
209 Maximum-number-of-frequency-blocks extracting section
210 Uplink scheduling information extracting section
211 Uplink control signal generator
212 Uplink RS signal generator
213 Uplink data signal generator
214 Multiplexer
215 Transmitter

BEST MODES FOR CARRYING OUT THE INVENTION

Figure 23:
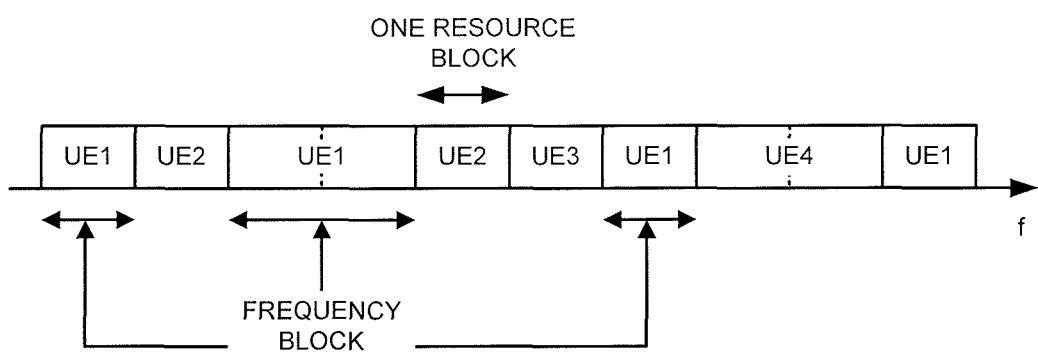
FIG. 23 A diagram for explaining frequency blocks.

According to Long Term Evolution (LTE) being currently standardized in the 3$^{rd}$ Generation Partnership Project (3GPP), Orthogonal Frequency Division Multiplexing (OFDM) is adopted for a downlink access scheme. The frequency domain channel dependent scheduling is applied to LTE downlink, and a plurality of frequency blocks can be allocated per mobile station within one Transmit Time Interval (TTI), where a frequency block is a resource block group composed of at least one or more resource blocks (RBs: each of which is composed of a plurality of subcarriers) that are consecutive on the frequency axis. FIG. 23 shows an example of frequency block allocation in LTE downlink scheduling. This represents a case in which four mobile stations are scheduled within one TTI in a system band. The number of frequency blocks for mobile station 1 (UE1) is three, the number of frequency blocks for mobile station 2 (UE2) is two, the frequency block for mobile station 3 (UE3) counts one and the frequency block for mobile station 4 (UE4) counts one.

The present invention is characterized in determining, when a base station that allocates a plurality of frequency blocks to one mobile station as described above allocates resource blocks to terminals, a minimal unit (which will be referred to as allocation resolution hereinbelow) for resource blocks to be allocated, and determining a structure in the Tree-Based method representing the allocated resource blocks. Now details of the present invention will be described below with reference to the accompanying drawings.

First Embodiment

The present embodiment will address a case in which a value of the resolution is determined in accordance with the number of frequency blocks determined in making scheduling (resource block allocation).

Figure 2:
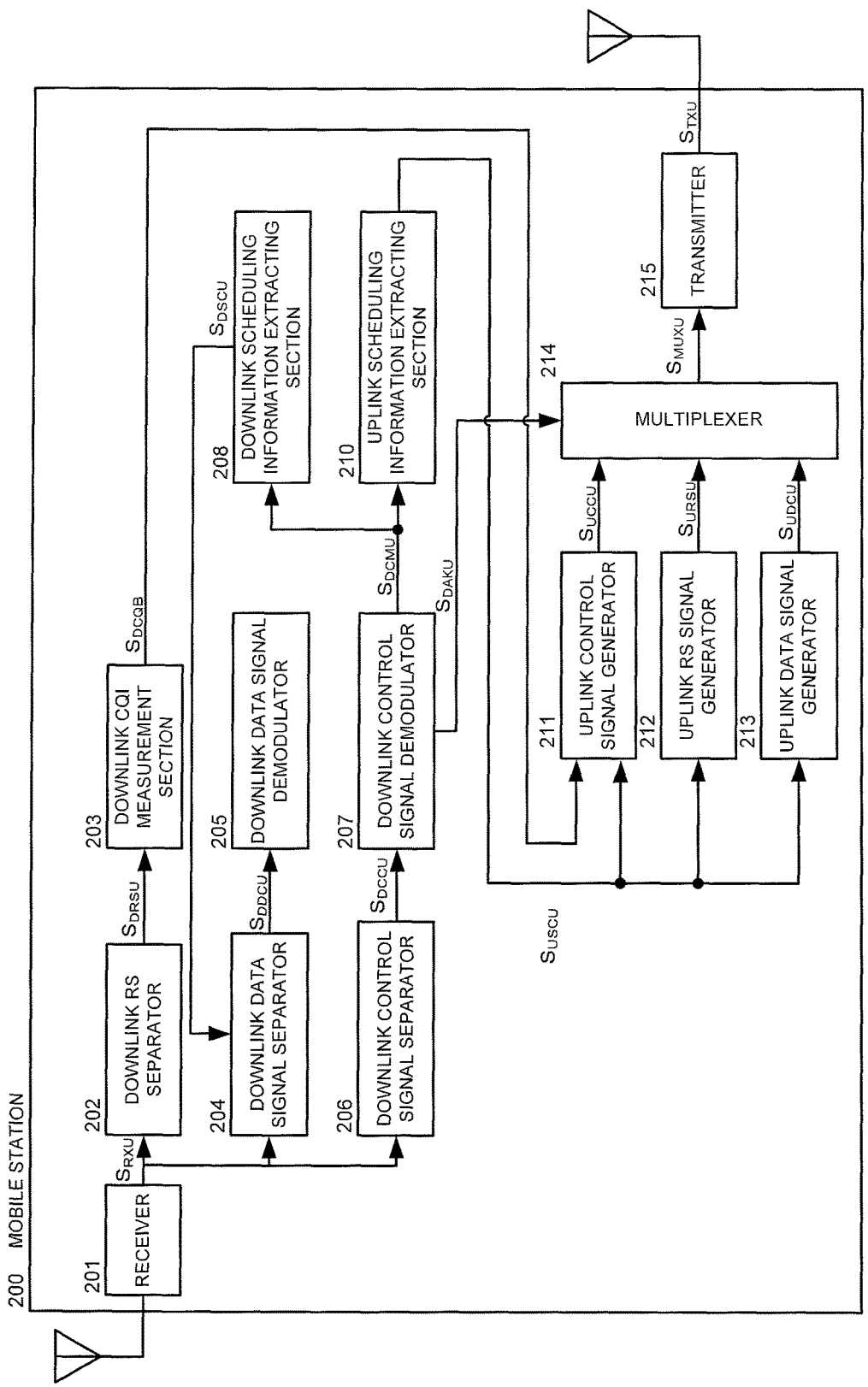
FIG. 2 A block diagram of a mobile station in the wireless communication system in the first embodiment.

A block diagram of a base station in the present embodiment is shown in FIG. 1, and that of a mobile station in FIG. 2.

First, a configuration of a base station 100 will be described.

A receiver 101 in the base station 100 receives a signal from a mobile station 200, establishes uplink synchronization using a guard interval, and outputs a base station receive signal $S_{RXB}$.

An uplink RS (Reference Signal) separator 102 separates from the base station receive signal $S_{RXB}$ an uplink RS signal $S_{URSB}$ in which uplink RS signals of a plurality of mobile stations are multiplexed, and outputs it.

An uplink CQI measurement section 103 receives the uplink RS signals $S_{URSB}$ for a plurality of mobile stations as input, calculates CQI (Channel Quality Indicator) for each mobile station on an RB-by-RB basis, and outputs it as uplink CQI information $S_{UCQB}$.

An uplink scheduler 104 makes uplink scheduling for each mobile station. The uplink scheduler 104 determines a number of frequency blocks for resources to be allocated based on the uplink CQI information $S_{UCQB}$. In particular, for good CQI, a larger number of frequency blocks is determined, and for poor CQI, a smaller number of frequency blocks is determined. RBs are allocated with an allocation resolution determined in accordance with the determined number of frequency blocks and with the determined number of frequency blocks. Once the allocation resolution has been determined, a structure in the Tree-Based method representing positions of the allocated RBs is determined accordingly. The resource allocation information for each frequency block representing the positions of the allocated RBs in a Tree-Based form is combined with the value of the allocation resolution into one piece of scheduling information, that is, one piece of UL Scheduling Grant $S_{USCB}$, which is output in a number of bits in accordance with the determined structure in the Tree-Based method. The number of frequency blocks is also output as $S_{UDFB}$.

Now processing in the uplink scheduler 104 will be specifically described next.

The uplink scheduler 104 modifies and sets a minimal frequency bandwidth in resource allocation, that is, an allocation resolution, which is a minimal unit for resource block allocation, according to the number of frequency blocks determined based on the uplink CQI information $S_{UCQB}$. Specifically, a higher allocation resolution is set for a larger number of frequency blocks.

Next, a specific example will be described below, in which the number of signaling bits for use in resource allocation for one user is held down within 14 bits for a system band having 10 RBs.

Figures 3, 4:
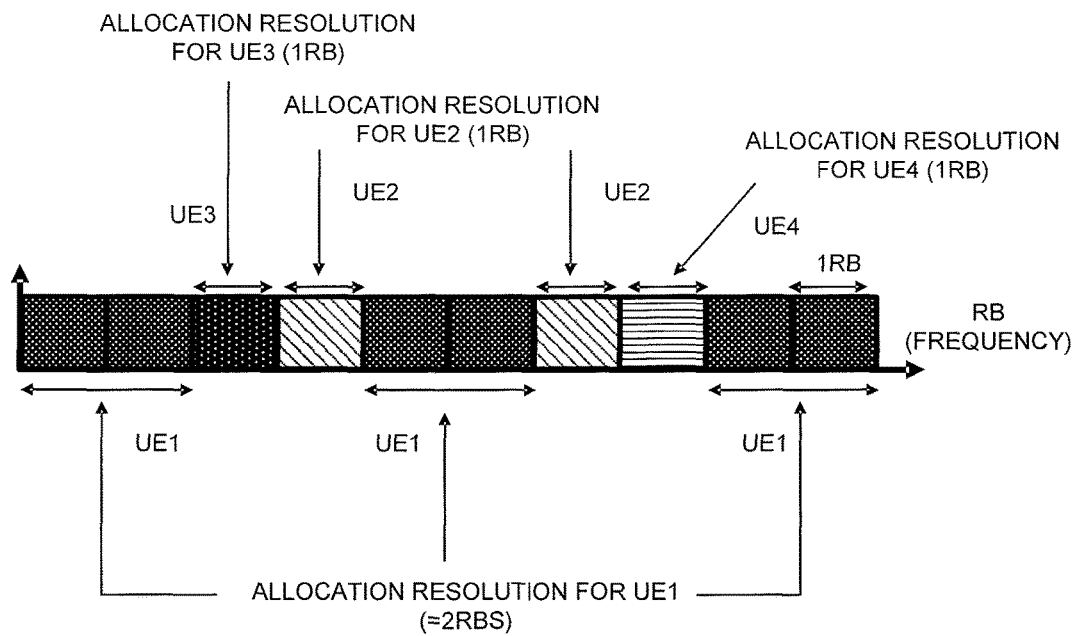
FIG. 3 An example of a correspondence table for a frequency block and an allocation resolution.
FIG. 4 A diagram showing an example of RBs allocated to a mobile station.
Figure 5:
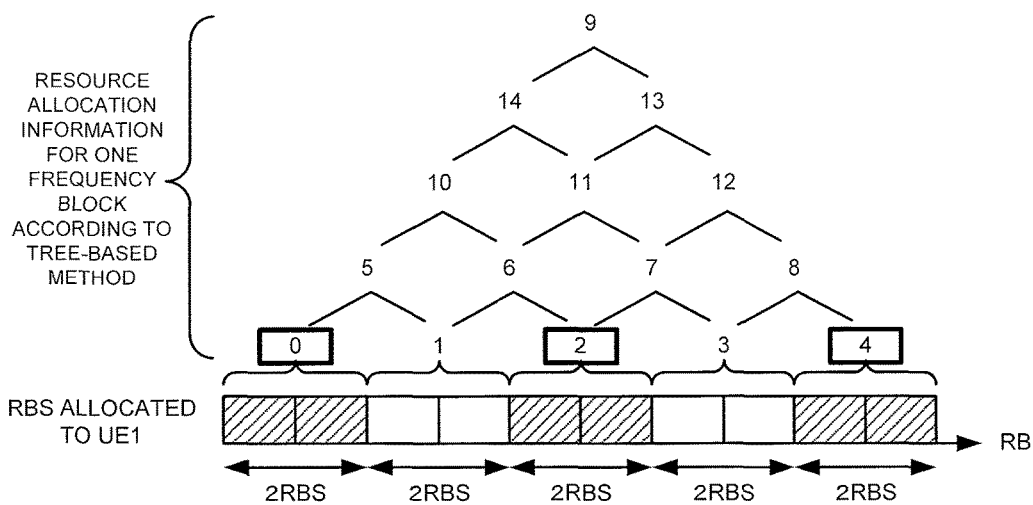
FIG. 5 A diagram showing an example of RBs allocated to UE1 and UL Scheduling Grant.
Figure 6:
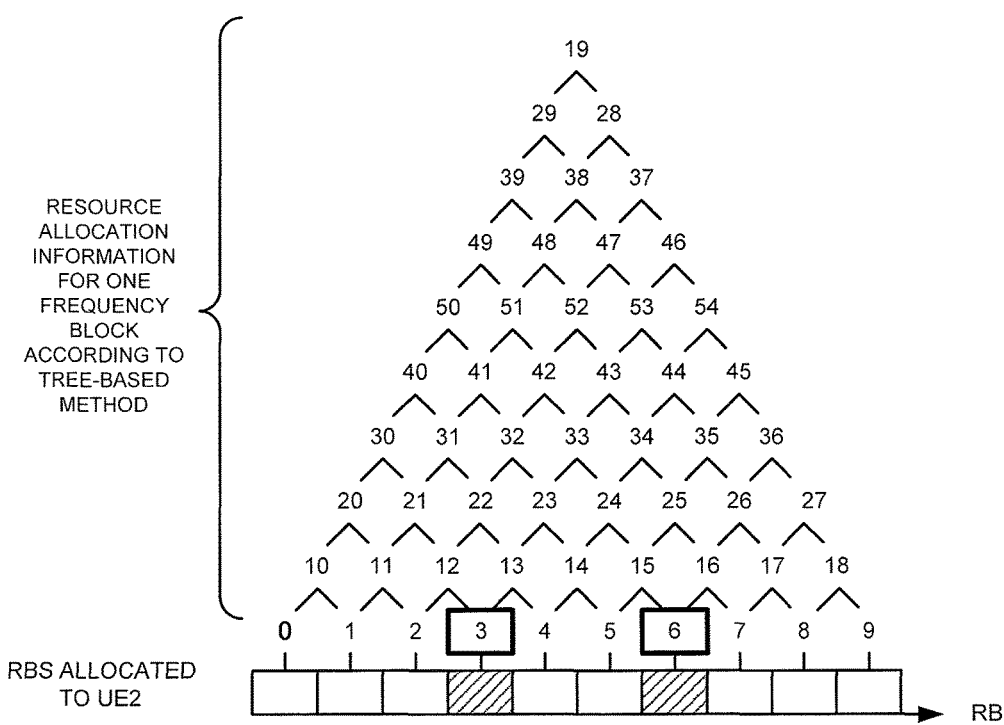
FIG. 6 A diagram showing an example of RBs allocated to UE2 and UL Scheduling Grant.

Resource allocation at the uplink scheduler 104 is made using a correspondence table representing a relationship between the number of frequency blocks and allocation resolution, as shown in FIG. 3. The correspondence table is defined depending upon a communication environment, etc. For example, a higher allocation resolution is defined for a larger number of frequency blocks. By using this relationship, it is possible to hold the number of signaling bits down to 14 bits including notification of the value of the allocation resolution (2 bits) for a number of frequency blocks of four or lower.

Assume that there are four mobile stations UE1, UE2, UE3, UE4, and the number of frequency blocks allocated to UE1 is three, that allocated to UE2 is two, that allocated to UE3 is one, and that allocated to UE4 is one. Now representing the resource blocks shown in FIG. 4 as RB0, RB1, . . . , RB8, RB9 in sequence from left to right, it is assumed that scheduling is made to allocate RB0, RB1, RB4, RB5, RB8 and RB9 to UE1, RB3 and RB6 to UE2, RB2 to UE3, and RB7 to UE4. Here, a case in which the scheduling in FIG. 4 and relationship between the number of frequency blocks and allocation resolution in FIG. 3 are used will be described. FIGS. 5, 6, 7 and 8 show examples of RB allocation and UL Scheduling Grant using the Tree-Based method for UE1, UE2, UE3 and UE4, respectively.

Figure 7:
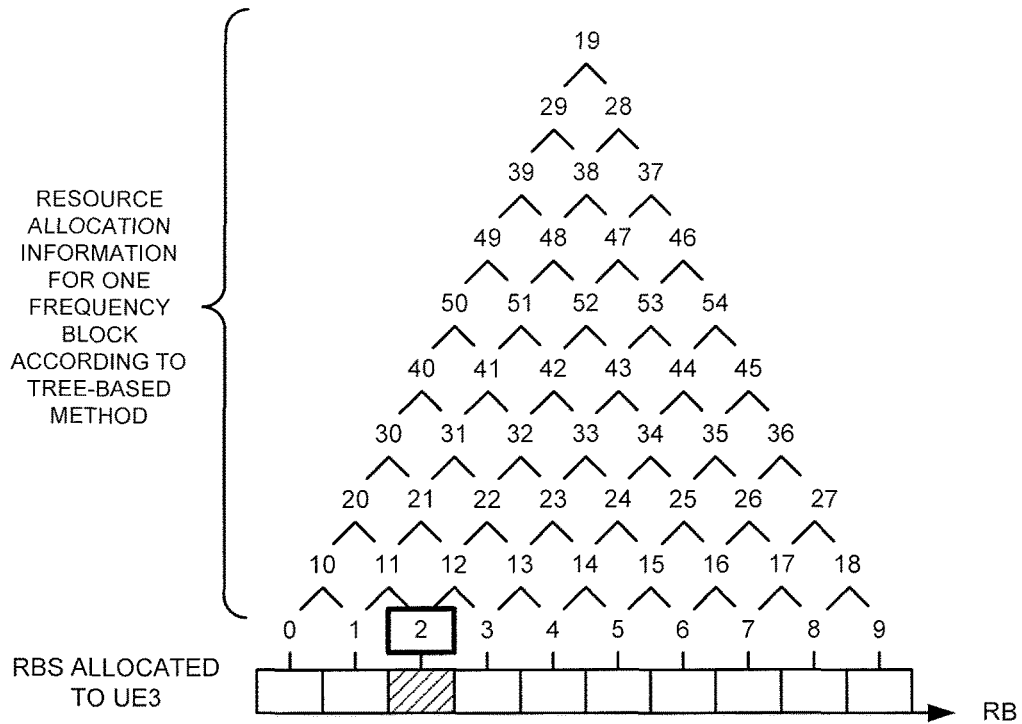
FIG. 7 A diagram showing an example of an RB allocated to UE3 and UL Scheduling Grant.
Figure 8:
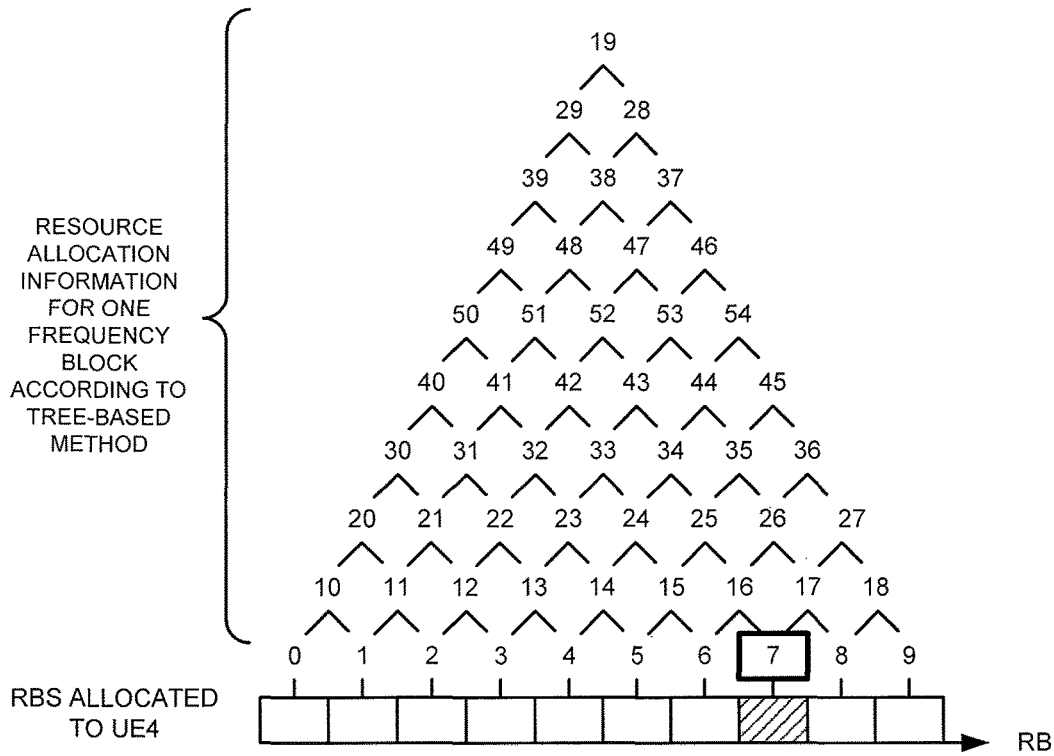
FIG. 8 A diagram showing an example of an RB allocated to UE4 and UL Scheduling Grant.

Since the number of frequency blocks is one for UE3 and UE4, the allocation resolution is 1 RB with reference to the correspondence table in FIG. 3. Therefore, when allocating resource blocks to UE3 and UE4, they are allocated such that one resource block is allocated with a number of frequency blocks within one. To represent a resource corresponding to one frequency block within the whole band, 10 RBs, in the Tree-Based method with an allocation resolution of 1 RB, a value of any one of 1-55 is required (6 bits). Referring to FIGS. 7 and 8, values of 1-55 representing resources of one frequency block are arranged in a tree structure. The tree structure in the Tree-Based method varies with the allocation resolution. In other words, the number of bits for UL Scheduling Grant also varies.

For example, referring to FIG. 9, when the allocation resolution is 1 RB, the tree structure is constructed from a number sequence of 1-55 that can be expressed by 6 bits. When the allocation resolution is 2 RBs, allocation is made for each unit of two resource blocks, so that it can be handled with a number sequence similar to that for a system band of five RBs. Accordingly, the tree structure is constructed from a number sequence of 1-15. By correlating the tree structure with the determined number of frequency blocks in a one-to-one correspondence, and notifying the allocation resolution or number of frequency blocks to the mobile station, a tree structure in the Tree-Based method can be discriminated.

Since scheduling is made with only a number of frequency blocks=1 for UE3 and UE4, they require a total of 8 bits (=1×6+2 bits) including notification of the value of the allocation resolution. Scheduling information on resource allocation (UL Scheduling Grant) to be notified to UE3 has 8 bits, and a value of the allocation resolution of "1" and a position of "2" ("2" in FIG. 7), which is the position of an allocated resource block represented in a tree structure, are notified thereto. UL Scheduling Grant for UE4 has 8 bits, and a value of the allocation resolution of "1" and a position represented in a tree structure, "7" ("7" in FIG. 8), are notified thereto.

For UE2, the number of frequency blocks is two, and therefore, the allocation resolution is 1 RB with reference to the correspondence table in FIG. 3. To represent a resource corresponding to one frequency block within the whole band, 10 RBs, in the Tree-Based method with an allocation resolution of 1 RB, a value of any one of 1-55 that can be denoted by 6 bits is required. Since scheduling is made with two frequency blocks for UE2, it requires a total of 14 bits (=2×6+2 bits) including notification of the value of the allocation resolution. Then, UL Scheduling Grant for UE2 has 14 bits, and a value of the allocation resolution of "1" and positions of allocated resource blocks represented in a tree structure, "3" and "6" ("3" and "6" in FIG. 6), are notified thereto.

For UE1, the number of frequency blocks is three, and therefore, the allocation resolution is 2 RBs with reference to the correspondence table in FIG. 3. To represent a resource corresponding to one frequency block within the whole band, 10 RBs, in the Tree-Based method with an allocation resolution of 2 RBs, a value of any one of 1-15, which can be denoted by 4 bits, is required. Since scheduling is made with three frequency blocks for UE1, it requires a total of 14 bits (=3×4+2 bits) including notification of the value of the allocation resolution. Then, UL Scheduling Grant for UE1 has 14 bits, and a value of the allocation resolution of "2" and positions of allocated resource blocks represented in a tree structure, "0", "2" and "4" ("0", "2" and "4" in FIG. 5) are notified thereto. By thus increasing the allocation resolution, the amount of information on resource allocation can be held down within 14 bits even for an increased number of frequency blocks.

Next, a general method of generating resource allocation information in a tree structure will be described. An example of an allocation resolution of P resource blocks (P is one or more) and a number of frequency blocks of n (n is one or more) will be described hereinbelow with reference to EQ. 1. In this example, one frequency block is defined as P (allocation resolution) consecutive resource blocks. Resource allocation information is composed of n resource indicator values (RIV's). The resource indicator value $RIV_n$ for an n-th frequency block represents a frequency block at start ($RBG_{start,n}$) and a length of subsequent frequency blocks ($L_{CRBGs,n}$). The n-th resource indicator value RIV is defined by EQ. 1 below:

if $(L_{CRBGs,n}-1) \leq \lfloor N_{RBG}^{UL}/2 \rfloor$            (EQ. 1)

then $RIV_n = N_{RB}^{UL}(L_{CRBGs,n}-1) + RBG_{START,n}$ else $RIV_n = N_{RBG}^{UL}(N_{RBG}^{UL} - L_{CRBGs,n}+1) + (N_{RBG}^{UL} - 1 - RBG_{START,n})$ where $N_{RBG}^{UL}$ is the number of frequency blocks in the whole system.

The number of resource blocks in the whole system is $N_{RBG}^{UL} \times P$ (allocation resolution).

The thus-generated UL Scheduling Grant $S_{USCB}$ is input to a downlink control signal generator 111. The downlink control signal generator 111 is also supplied as input with DL Scheduling Grant $S_{DSCB}$, mobile station identification information $S_{UIDB}$, and frequency block signal $S_{UDFB}$ with which the number of frequency blocks is indicated. The downlink control signal generator 111 multiplexes these input signals to generate a downlink control signal as PDCCH (Physical Downlink Control Channel) $S_{DCCB}$, and outputs it.

A downlink RS signal generator 112 generates a downlink RS signal and outputs it as a downlink RS signal $S_{DRSB}$.

A downlink data signal generator 113 receives the DL Scheduling Grant $S_{DSCB}$ as input, multiplexes downlink data signals from a plurality of mobile stations in accordance with an RB pattern indicated by the DL Scheduling Grant $S_{DSCB}$, generates Physical Downlink Shared Channel (PDSCH) $S_{DCCB}$, and outputs it.

A multiplexer 114 receives the PDCCH $S_{DCCB}$, RS signal $S_{DRSB}$ and DRSB and PDSCH $S_{DDCB}$ as input, multiplexes these signals to generate a downlink multiplexed signal $S_{MUXB}$, and outputs it.

A transmitter 115 receives the downlink multiplexed signal $S_{MUXB}$ as input, generates a transmit signal $S_{TXB}$, and outputs it.

An uplink data signal separator 106 receives the base station receive signal $S_{RXB}$ as input, extracts therefrom Physical Uplink Shared Channel (PUSCH) $S_{UDCB}$ in which uplink data signals from a plurality of mobile stations are multiplexed, and outputs it. An uplink data signal demodulator 109 is supplied with the PUSCH $S_{UDCB}$ as input, demodulates the PUSCH $S_{UDCB}$, and reproduces mobile station transmitted data.

An uplink control signal separator 108 receives the base station receive signal $S_{RXB}$ as input, extracts therefrom Physical Uplink Control Channel (PUCCH) $S_{UCCB}$ in which uplink control signals from a plurality of mobile stations are multiplexed, and outputs it. An uplink control signal demodulator 109 demodulates the PUCCH $S_{UCCB}$, and outputs a downlink CQI measurement signal $S_{DCQB}$, which is a result of measurement of downlink CQI transmitted by a plurality of mobile stations. A downlink scheduler 110 receives the downlink CQI measurement signal $S_{DCQB}$ as input, makes downlink scheduling for a plurality of mobile stations, generates DL Scheduling Grant $S_{DSCB}$, which represents information on allocated RBs, and outputs it.

A UE ID generator 116 generates mobile station identification information $S_{UIDB}$, and outputs it.

Subsequently, a mobile station will be described. FIG. 2 is a block diagram showing a main configuration of a mobile station in the present embodiment.

A receiver 201 in a mobile station 200 receives a signal from the base station 100, establishes downlink synchronization using a guard interval, and outputs a mobile station receive signal $S_{RXU}$.

A downlink RS (Reference Signal) separator 202 receives the mobile station receive signal $S_{RXU}$ as input, separates therefrom a downlink RS signal $S_{DRSU}$ in which downlink RS signals are multiplexed, and outputs it. A downlink CQI measurement section 203 receives the downlink RS signal $S_{DRSU}$ as input, calculates CQI on an RB-by-RB basis, and outputs it as downlink CQI information $S_{DCQB}$.

A downlink control signal separator 206 receives the mobile station receive signal $S_{RXU}$ as input, separates therefrom PDCCH $S_{DCCU}$ in which downlink control signals from a plurality of mobile stations are multiplexed, and outputs it.

A downlink control signal demodulator 207 receives the PDCCH $S_{DCCU}$ as input, demodulates the PDCCH $S_{DCCU}$ to reproduce a downlink control signal, separates therefrom a result of reproduction in which mobile station identification information corresponding to the mobile station itself is multiplexed, and outputs it as a downlink control reproduced signal $S_{DCMU}$. It should be noted that only one PDCCH is multiplexed for the mobile station itself. Moreover, the downlink control signal demodulator 207 checks a result of demodulation of the PDCCH $S_{DCCU}$ and reproduction of the downlink control signal as to whether it contains an error, in a case that no error is found, generates a signal indicating ACK, or otherwise, a signal indicating NACK as a downlink control signal decision signal $S_{DAKU}$, and outputs it. It should be noted that the downlink control signal decision signal $S_{DAKU}$ is notified from the mobile station 200 to the base station 100, and in a case that the downlink control signal decision signal $S_{DAKU}$ is NACK, the base station 100 retransmits PDCCH corresponding to the mobile station 200.

A downlink scheduling information extracting section 208 receives the downlink control reproduced signal $S_{DCMU}$ as input, extracts therefrom downlink RB allocation decision information $S_{DSCU}$ corresponding to downlink resource allocation information, and outputs it.

An uplink scheduling information extracting section 210 extracts, from the downlink control reproduced signal $S_{DCMU}$, UL Scheduling Grant that represents information on allocated uplink RBs. Next, it discriminates a tree structure in the Tree-Based method from the value of the allocation resolution contained in the UL Scheduling Grant, identifies an RB indicated by the uplink RB allocation information in this tree structure, and outputs it as uplink RB allocation decision information $S_{USCU}$.

An uplink control signal generator 211 receives the uplink RB allocation decision information $S_{USCU}$ and downlink CQI information $S_{DCQB}$ as input, generates Physical Uplink Control Channel (PUCCH) $S_{UCCU}$ in which the downlink CQI information $S_{DCQB}$ is multiplexed with a predetermined resource for a control signal indicated by the uplink RB allocation decision information $S_{USCU}$, and outputs it.

An uplink RS signal generator 212 receives the uplink RB allocation decision information $S_{USCU}$ as input, generates an uplink RS transmit signal $S_{URSU}$ using a predetermined resource for RS in the uplink RB allocation decision information $S_{USCU}$, and outputs it.

An uplink data signal generator 213 receives the uplink RB allocation decision information $S_{USCU}$ as input, generates Physical Uplink Shared Channel (PUSCH) $S_{UDCU}$ using a predetermined resource for a data signal in the uplink RB allocation decision information $S_{USCU}$, and outputs it.

A multiplexer 214 receives the PUCCH $S_{UCCU}$, uplink RS transmit signal $S_{URSU}$, PUSCH $S_{UDCU}$ and downlink control signal decision signal $S_{DAKU}$ as input, multiplexes these signals to generate a mobile station multiplexed signal $S_{MUXU}$, and outputs it. The transmitter 215 receives the mobile station multiplexed signal $S_{MUXU}$ as input, generates a mobile station transmit signal $S_{TUX}$, and transmits it to the base station 100.

A downlink data signal separator 204 receives the downlink RB allocation receive signal $S_{DSCU}$ and mobile station receive signal $S_{RXU}$ as input, separates therefrom PDSCH $S_{DDCU}$ multiplexed with the downlink RB allocated to the mobile station itself based on the downlink RB allocation decision information $S_{DSCU}$, and outputs it. The downlink data signal demodulator 205 receives PDSCH $S_{DDCU}$ as input, demodulates the PDSCH $S_{DDCU}$, and reproduces transmitted data from the base station to the mobile station itself.

Figure 10:
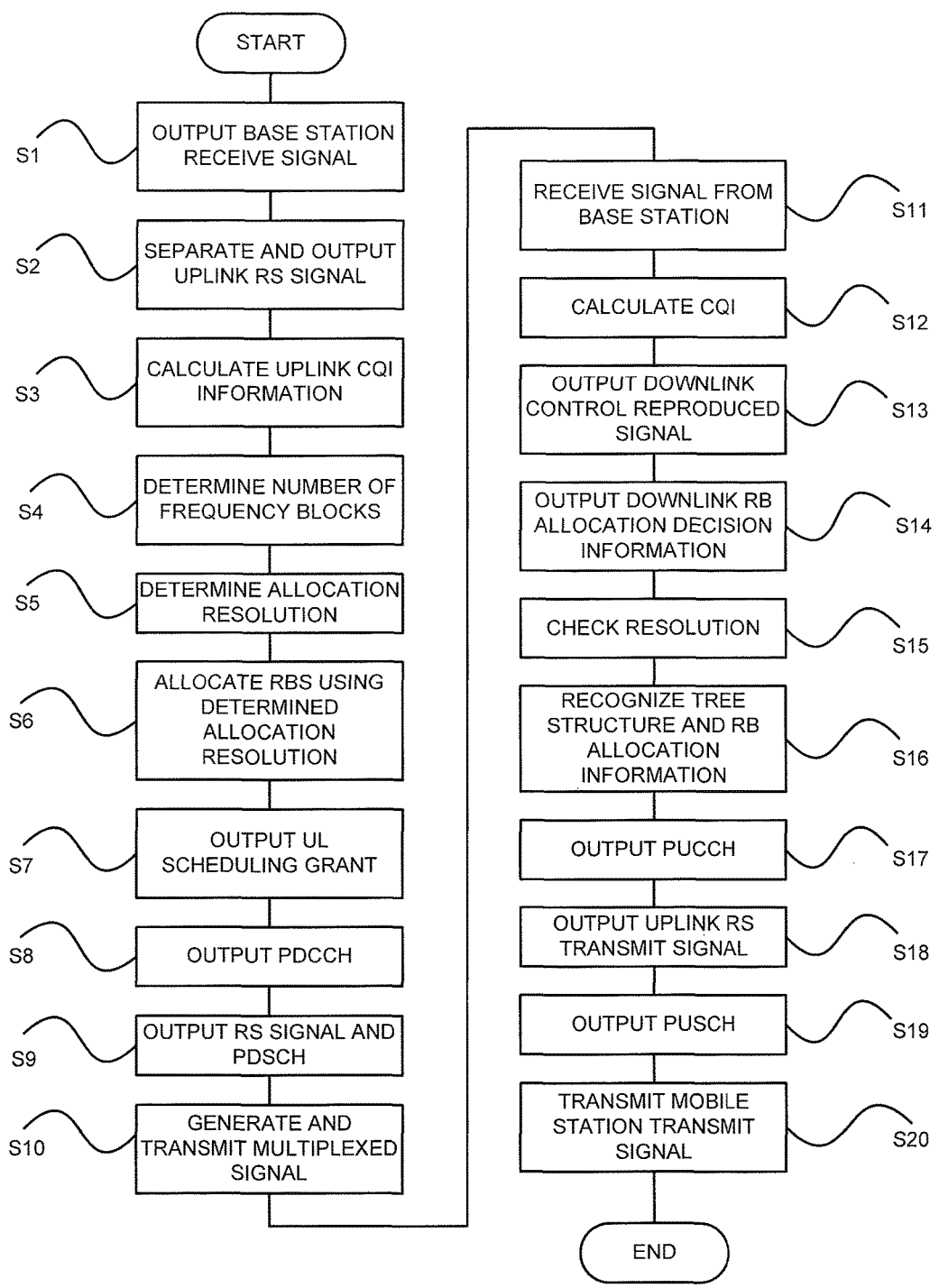
FIG. 10 A flow chart of the first embodiment.

Subsequently, an operation of the present embodiment will be described with reference to a flow chart in FIG. 10.

The receiver 101 in the base station 100 receives a signal from the mobile station 200, establishes uplink synchronization using a guard interval, and outputs a base station receive signal $S_{RXB}$ (Step S1).

The uplink RS (Reference Signal) separator 102 separates from the output base station receive signal $S_{RXB}$ an uplink RS signal $S_{URSB}$ in which uplink RS signals from a plurality of mobile stations are multiplexed, and outputs it (Step S2).

From the uplink RS signals $S_{URSB}$ for a plurality of mobile stations, the uplink CQI measurement section 103 calculates CQI (Channel Quality Indicator) for each mobile station on an RB-by-RB basis, and outputs it as uplink CQI information $S_{UCQB}$ (Step S3).

The uplink scheduler 104 determines a number of frequency blocks for resources to be allocated to each mobile station based on the uplink CQI information $S_{UCQB}$ for each mobile station (Step S4).

An allocation resolution correlated with the determined number of frequency blocks is determined using the correspondence table as shown in FIG. 3 kept in the equipment itself, whereby a structure in the Tree-Based method is determined, and the number of bits for UL Scheduling Grant is set as a number of bits in accordance with the determined structure in the Tree-Based method (Step S5).

RBs are allocated with resource blocks in a number equal to the determined allocation resolution and with the determined number of frequency blocks (Step S6).

Next, the uplink scheduler 104 outputs scheduling information representing positions of the allocated RBs in a Tree-Based form and the value of the allocation resolution in a specified number of bits as UL Scheduling Grant $S_{USCB}$, and outputs the number of frequency blocks as $S_{UDFB}$ (Step S7).

The downlink control signal generator 111 is supplied as input with the UL Scheduling Grant $S_{USCB}$, DL Scheduling Grant $S_{DSCB}$, mobile station identification information $S_{UIDB}$ and frequency block signal $S_{UDFB}$, multiplexes these input signals to generate a downlink control signal as PDCCH (Physical Downlink Control Channel) $S_{DCCB}$, and outputs it (Step S8).

The downlink RS signal generator 112 generates a downlink RS signal as a downlink RS signal $S_{DRSB}$, and outputs it; the downlink data signal generator 113 receives the DL Scheduling Grant $S_{DSCB}$ as input, multiplexes downlink data signals from a plurality of mobile stations together in accordance with an RB pattern indicated by the DL Scheduling Grant $S_{DSCB}$, generates Physical Downlink Shared Channel (PDSCH) $S_{DDCB}$, and outputs it (Step S9).

The multiplexer 114 receives the PDCCH $S_{DCCB}$, RS signal $S_{DRSB}$ and PDSCH $S_{DDCB}$ as input, multiplexes these signals to generate a downlink multiplexed signal $S_{MUXB}$, and outputs it; the transmitter 115 receives the downlink multiplexed signal $S_{MUXB}$ as input, generates a transmit signal $S_{TXB}$, and outputs it (Step S10).

The receiver 201 in the mobile station 200 receives a signal from the base station 100, establishes downlink synchronization using a guard interval, and outputs a mobile station receive signal $S_{RXU}$ (Step S11).

The downlink RS (Reference Signal) separator 202 receives the mobile station receive signal $S_{RXU}$ as input, and separates therefrom a downlink RS signal $S_{DRSU}$ in which the downlink RS signals are multiplexed; the downlink CQI measurement section 203 receives the downlink RS signal $S_{DRSU}$ as input, calculates CQI on an RB-by-RB basis, and outputs it as downlink CQI information $S_{DCQB}$ (Step S12).

The downlink control signal separator 206 receives the mobile station receive signal $S_{RXU}$ as input, and separates therefrom PDCCH $S_{DCCU}$ in which downlink control signals from a plurality of mobile stations are multiplexed; the downlink control signal demodulator 207 demodulates the PDCCH $S_{DCCU}$ to reproduce a downlink control signal, separates therefrom a result of reproduction in which mobile station identification information corresponding to the mobile station itself is multiplexed, and outputs it as a downlink control reproduced signal $S_{DCMU}$ (Step S13).

The downlink scheduling information extracting section 208 receives the downlink control reproduced signal $S_{DCMU}$ as input, extracts therefrom downlink RB allocation decision information $S_{DSCU}$ corresponding to downlink resource allocation information, and outputs it (Step S14).

The uplink scheduling information extracting section 210 extracts, from the downlink control reproduced signal $S_{DCMU}$, UL Scheduling Grant, which represents information on allocated uplink RBs, and checks the value of the allocation resolution (Step S15).

Next, it discriminates a tree structure in the Tree-Based method from the value of the allocation resolution, identifies RBs indicated by the uplink RB allocation information in this tree structure, and outputs it as uplink RB allocation decision information $S_{USCU}$ (Step S16).

The uplink control signal generator 211 receives the uplink RB allocation decision information $S_{USCU}$ and downlink CQI information $S_{DCQB}$ as input, generates Physical Uplink Control Channel (PUCCH) $S_{UCCU}$ in which the downlink CQI information $S_{DCQB}$ is multiplexed with a predetermined resource for a control signal indicated by the uplink RB allocation decision information $S_{USCU}$, and outputs it (Step S17).

The uplink RS signal generator 212 receives the uplink RB allocation decision information $S_{USCU}$ as input, generates an uplink RS transmit signal $S_{URSU}$ using a predetermined resource for RS in the uplink RB allocation decision information $S_{USCU}$, and outputs it (Step S18).

The uplink data signal generator 213 receives the uplink RB allocation decision information $S_{USCU}$ as input, generates Physical Uplink Shared Channel (PUSCH) $S_{UDCU}$ using a predetermined resource for a data signal in the uplink RB allocation decision information $S_{USCU}$, and outputs it (Step S19).

The multiplexer 214 receives the PUCCH $S_{UCCU}$, uplink RS transmit signal $S_{URSU}$, PUSCH $S_{UDCU}$ and downlink control signal decision signal $S_{DAKU}$ as input, and multiplexes these signals to generate a mobile station multiplexed signal $S_{MUXU}$; the transmitter 215 transmits the mobile station transmit signal $S_{MUXU}$ to the base station 100 (Step S20).

While a mode in which the number of frequency blocks is determined from a condition of mobile station's channel quality (the CQI measured by a sounding reference signal) is addressed in the embodiment described above, it may be contemplated that the present embodiment uses information about a communication environment, such as, for example, the cell size, system bandwidth, coverage of a base station, bandwidth of an uplink sounding reference signal, bandwidth used in uplink data transmission, number of levels in multi-level modulation and code rate used in uplink data transmission, transmittable/receivable bandwidth of a mobile station (sometimes referred to as UE capability), and type of uplink transmission data (VoIP, HTTP, FTP etc.), or information affecting the communication environment, such as the billing scheme in which a user signs on, power headroom (which is a difference between the maximum transmit power of a mobile station and an actual transmit power of the mobile station), and target SINR in uplink power control. Moreover, since the cell size is determined by information affecting the communication environment, such as the location of a base station, distance between base stations, and interference power, these information may be used to select a number of frequency blocks.

Furthermore, while the description has been made in the present embodiment using a configuration in which a number of frequency blocks is determined from a condition of mobile station's channel quality and an allocation resolution is set in accordance with the frequency blocks, the configuration may be one such that the allocation resolution is set in accordance with a condition of mobile station's channel quality, the information on a communication environment described above, or the information that affect a communication environment described above. Moreover, in the present embodiment, the number of frequency blocks is described as being notified through Physical Downlink Control Channel (PDCCH), it is additionally notified with a control signal in a higher layer mapped over PBCH (Physical Broadcast Channel), PDSCH (Physical Downlink Shared Channel), which is also referred to as Dynamic BCH, or the like. In this case, a number of frequency blocks $S_{UDFB}$ is input to a PBCH generator or PDSCH generator (both not shown) provided in the downlink control signal generator 111 in the base station, and is notified to a mobile station through the PBCH or PDSCH. Furthermore, since information on the uplink and downlink control signals varies from frame to frame in about 1 msec, there arises a problem that processing in a terminal becomes complicated in a case that the allocation resolution is modified with such a variation. Thus, additional limitation may be posed to modify the allocation resolution in a cycle of a plurality of frames.

Moreover, while the description has been made using a mode in which the uplink scheduler 104 allocates RBs with resource blocks in a number equal to the determined allocation resolution and with the determined number of frequency blocks in the present embodiment, a mode may be contemplated in which RBs are allocated with resource blocks in a number equal to the determined allocation resolution and within the determined number of frequency blocks.

The system band has been described as having 10 RBs for simplifying the explanation above; now an effect of reducing the number of bits in an actual LTE system having a system band of 20 MHz will be described. Similarly to the LTE downlink in which a plurality of frequency blocks can be allocated, the number of bits required for one frequency block in making notification using the Tree-Based method in a system band of 20 MHz (the number of RBs=100) is $\log_2 100(100+1)/2=13$ bits. Thus, a correspondence table of the number of frequency blocks and allocation resolution as shown FIG. 3 is established so as not to exceed 37 bits, which is an upper limit of the scheduling information stipulated for actual LTE downlink. FIG. 11 shows a number of bits required to notify RB patterns for frequency blocks in a number equal to the number of frequency blocks using the Tree-Based method, for numbers of frequency blocks of 1-4, respectively. Thus, in accordance with the present invention, the correspondence between the number of frequency blocks and allocation resolution can be established in accordance with an environment, and therefore, it is possible to hold the number of signaling bits for scheduling information down to 35 bits, including notification of an allocation resolution (two bits), which is less than the stipulated upper limit, 37 bits.

As described above, the number of frequency blocks for a mobile station with good channel quality is increased, while that for a mobile station with poor channel quality is decreased, and an allocation resolution is determined accordingly. This is because a mobile station with good channel quality performs transmission with a lower electric power density, and hence, with a broader band, and since the channel quality is good as a whole, it will not be degraded even when the allocation resolution is increased with the number of frequency blocks. On the other hand, a mobile station with poor channel quality performs transmission with a higher electric power density, and hence, with a narrower band, and since the channel quality is poor as a whole, the allocation resolution must be reduced with the number of frequency blocks in order to accurately select better resources among all. Thus, by correlating the allocation resolution, the number of frequency blocks and the channel quality of a mobile station, degradation of the reception property due to setting of an allocation resolution may be reduced.

Second Embodiment

The embodiment described above addresses a case in which a base station notifies a value of the allocation resolution borne on UL Scheduling Grant to a mobile station. The following embodiment will address a case in which a base station sets an allocation resolution correlated with a number of frequency blocks in one-to-one correspondence, and a mobile station recognizes the allocation resolution from the notified number of frequency blocks. It should be noted that components similar to those in the foregoing embodiment are designated by similar reference numerals and detailed description thereof will be omitted.

The uplink scheduler 104 in the base station 100 makes uplink scheduling for each mobile station. The uplink scheduler 104 determines a number of frequency blocks for resources to be allocated based on uplink CQI information $S_{UCQB}$. RBs are allocated with an allocation resolution set in accordance with the determined number of frequency blocks and with the determined number of frequency blocks. The scheduling information representing positions of the allocated RBs is output as UL Scheduling Grant $S_{USCB}$, and the number of frequency blocks is output as $S_{UDFB}$.

The downlink control signal generator 111 in the base station 100 receives the UL Scheduling Grant $S_{USCB}$, DL Scheduling Grant $S_{DSCB}$, mobile station identification information $S_{UIDB}$, and frequency block signal $S_{UDFB}$ as input, multiplexes these signals to generate a downlink control signal as PDCCH (Physical Downlink Control Channel) $S_{DCCB}$, and outputs it. It should be noted that the number of frequency blocks is notified not only through the Physical Downlink Control Channel (PDCCH) but also through PBCH, PDSCH, etc.

The downlink control signal demodulator 207 in the mobile station 200 receives the PDCCH $S_{DCCU}$ as input, demodulates the PDCCH $S_{DCCU}$ to reproduce a downlink control signal, separates therefrom a result of reproduction in which mobile station identification information corresponding to the mobile station itself is multiplexed, and outputs it as a downlink control reproduced signal $S_{DCMU}$.

The uplink scheduling information extracting section 210 in the mobile station 200 extracts, from the downlink control reproduced signal $S_{DCMU}$, UL Scheduling Grant, which represents information on allocated uplink RBs, and frequency block signal $S_{UDFU}$. Next, it recognizes an allocation resolution correlated with the number of frequency blocks in a one-to-one correspondence from the frequency block signal $S_{UDFU}$ and the correspondence table kept by the mobile station itself. It then discriminates a tree structure in the Tree-Based method from the allocation resolution, identifies RBs indicated by the uplink RB allocation information in this tree structure, and outputs it as uplink RB allocation decision information $S_{USCU}$.

Figure 12:
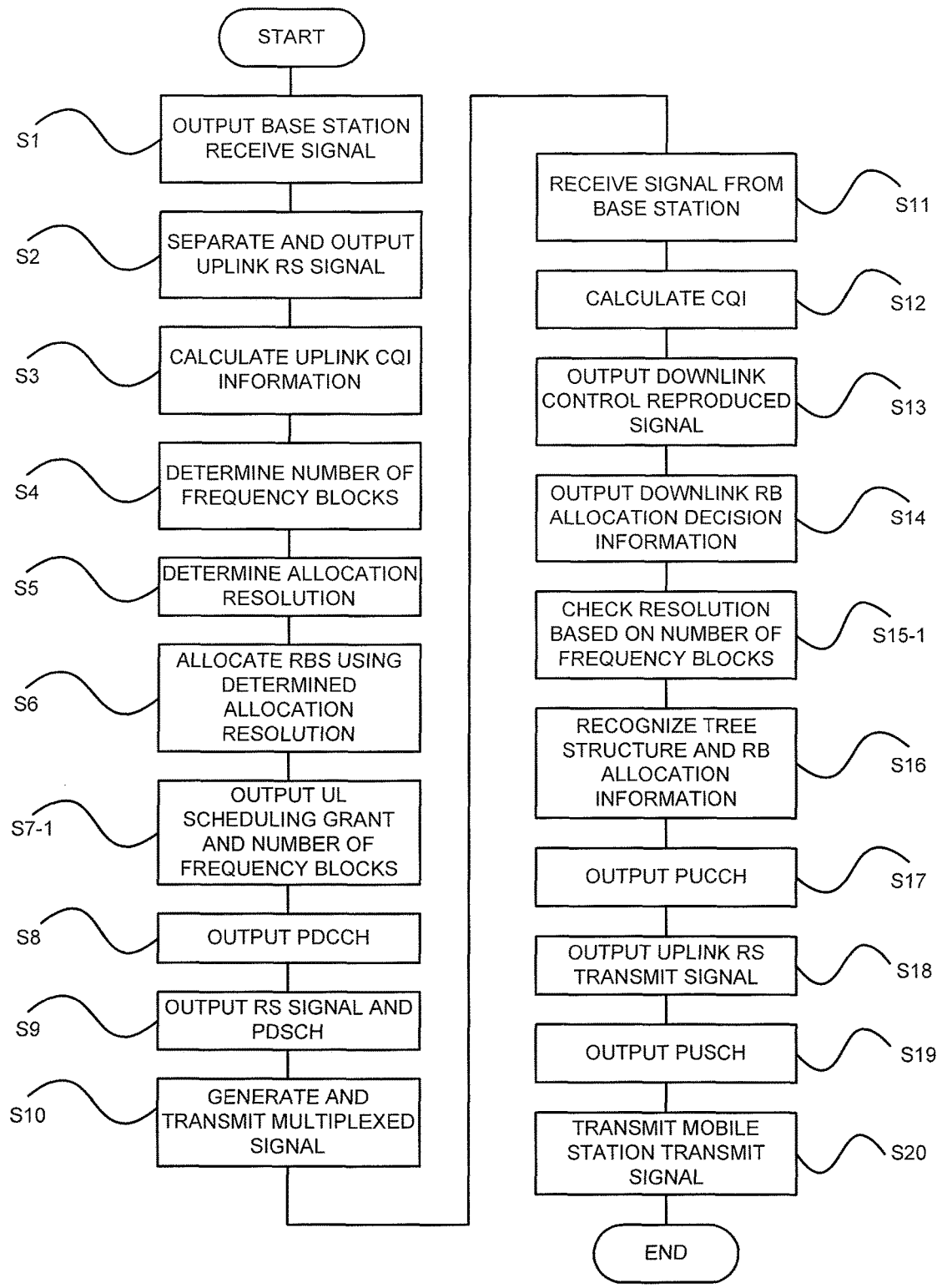
FIG. 12 A flow chart of a second embodiment.

Subsequently, an operation of the present embodiment will be described with reference to a flow chart in FIG. 12.

The receiver 101 in the base station 100 receives a signal from the mobile station 200, establishes uplink synchronization using a guard interval, and outputs a base station receive signal $S_{RXB}$ (Step S1).

The uplink RS (Reference Signal) separator 102 separates from the output base station receive signal $S_{RXB}$ an uplink RS signal $S_{URSB}$ in which uplink RS signals from a plurality of mobile stations are multiplexed, and outputs it (Step S2).

From the uplink RS signals $S_{URSB}$ for a plurality of mobile stations, the uplink CQI measurement section 103 calculates CQI (Channel Quality Indicator) for each mobile station on an RB-by-RB basis, and outputs it as uplink CQI information $S_{UCQB}$ (Step S3).

The uplink scheduler 104 determines a number of frequency blocks for resources to be allocated to each mobile station based on the uplink CQI information $S_{UCQB}$ for each mobile station (Step S4).

An allocation resolution correlated with the determined number of frequency blocks is determined using the correspondence table as shown in FIG. 3 kept in the equipment itself, whereby a structure in the Tree-Based method is determined, and the number of bits for UL Scheduling Grant is set as a number of bits in accordance with the determined structure in the Tree-Based method (Step S5).

RBs are allocated with resource blocks in a number equal to the determined allocation resolution and with the determined number of frequency blocks (Step S6).

Next, the uplink scheduler 104 outputs scheduling information representing positions of the allocated RBs in a Tree-Based form in a specified number of bits as UL Scheduling Grant $S_{USCB}$, and outputs the number of frequency blocks as $S_{UDFB}$ (Step S7-1).

The downlink control signal generator 111 is supplied as input with the UL Scheduling Grant $S_{USCB}$, DL Scheduling Grant $S_{DSCB}$, mobile station identification information $S_{UIDB}$ and frequency block signal $S_{UDFB}$, multiplexes these input signals to generate a downlink control signal as PDCCH (Physical Downlink Control Channel) $S_{DCCB}$, and outputs it (Step S8).

The downlink RS signal generator 112 generates a downlink RS signal as a downlink RS signal $S_{DRSB}$, and outputs it; the downlink data signal generator 113 receives the DL Scheduling Grant $S_{DSCB}$ as input, multiplexes downlink data signals from a plurality of mobile stations together in accordance with an RB pattern indicated by the DL Scheduling Grant $S_{DSCB}$, generates Physical Downlink Shared Channel (PDSCH) $S_{DDCB}$, and outputs it (Step S9).

The multiplexer 114 receives the PDCCH $S_{DCCB}$, RS signal $S_{DRSB}$ and PDSCH $S_{DDCB}$ as input, multiplexes these signals to generate a downlink multiplexed signal $S_{MUXB}$, and outputs it; the downlink multiplexed signal $S_{MUXB}$ is transmitted by the transmitter 115 (Step S10).

The receiver 201 in the mobile station 200 receives a signal from the base station 100, establishes downlink synchronization using a guard interval, and outputs a mobile station receive signal $S_{RXU}$ (Step S11).

The downlink RS (Reference Signal) separator 202 receives the mobile station receive signal $S_{RXU}$ as input, and separates therefrom a downlink RS signal $S_{DRSU}$ in which the downlink RS signals are multiplexed; the downlink CQI measurement section 203 calculates CQI from the downlink RS signal $S_{DRSU}$ on an RB-by-RB basis, and outputs it as downlink CQI information $S_{DCQB}$ (Step S12).

The downlink control signal separator 206 receives the mobile station receive signal $S_{RXU}$ as input, separates therefrom PDCCH $S_{DCCU}$ in which downlink control signals from a plurality of mobile stations are multiplexed, and outputs it; the downlink control signal demodulator 207 demodulates the PDCCH $S_{DCCU}$ to reproduce a downlink control signal, separates therefrom a result of reproduction in which mobile station identification information corresponding to the mobile station itself is multiplexed, and outputs it as a downlink control reproduced signal $S_{DCMU}$ (Step S13).

The downlink scheduling information extracting section 208 receives the downlink control reproduced signal $S_{DCMU}$ as input, extracts therefrom downlink RB allocation decision information $S_{DSCU}$ corresponding to downlink resource allocation information, and outputs it (Step S14).

The uplink scheduling information extracting section 210 extracts, from the downlink control reproduced signal $S_{DCMU}$, UL Scheduling Grant, which represents information on allocated uplink RBs, and frequency block signal $S_{UDFU}$, and recognizes the value of the allocation resolution based on the number of frequency blocks represented by the frequency block signal $S_{UDFU}$ (Step S15-1).

Next, it discriminates a tree structure in the Tree-Based method from the value of the allocation resolution, identifies RBs indicated by the uplink RB allocation information in this tree structure, and outputs it as uplink RB allocation decision information $S_{USCU}$ (Step S16).

The uplink control signal generator 211 receives the uplink RB allocation decision information $S_{USCU}$ and downlink CQI information $S_{DCQB}$ as input, generates Physical Uplink Control Channel (PUCCH) $S_{UCCU}$ in which the downlink CQI information $S_{DCQB}$ is multiplexed with a predetermined resource for a control signal indicated by the uplink RB allocation decision information $S_{USCU}$, and outputs it (Step S17).

The uplink RS signal generator 212 receives the uplink RB allocation decision information $S_{USCU}$ as input, generates an uplink RS transmit signal $S_{URSU}$ using a predetermined resource for RS in the uplink RB allocation decision information $S_{USCU}$, and outputs it (Step S18).

The uplink data signal generator 213 receives the uplink RB allocation decision information $S_{USCU}$ as input, generates Physical Uplink Shared Channel (PUSCH) $S_{UDCU}$ using a predetermined resource for a data signal in the uplink RB allocation decision information $S_{USCU}$, and outputs it (Step S19).

The multiplexer 214 receives the PUCCH $S_{UCCU}$, uplink RS transmit signal $S_{URSU}$, PUSCH $S_{UDCU}$ and downlink control signal decision signal $S_{DAKU}$ as input, and multiplexes these signals to generate a mobile station multiplexed signal $S_{MUXU}$; the transmitter 215 transmits the mobile station transmit signal $S_{MUXU}$ to the base station 100 (Step S20).

Other methods include one involving correlating the allocation resolution with downlink CQI information and/or with localization information for a mobile station in the uplink control signal that the mobile station notifies to the base station, with MCS (Modulation and Coding Scheme) and/or with power control target value in the downlink control signal that the base station notifies to the mobile station, or the like in a one-to-one correspondence. By correlating information in these control signals with the allocation resolution, the allocation resolution can be shared between the base station and mobile station. Moreover, a tree structure in the Tree-Based method may be discriminated from the number of frequency blocks notified by the base station.

According to the present embodiment, since the value of the allocation resolution is not notified, the number of signaling bits can be reduced by those for notifying the value of the allocation resolution (two bits).

Third Embodiment

The embodiments described above have addressed a case in which an allocation resolution is determined in accordance with the number of frequency blocks determined by the uplink scheduler 104. The following embodiment will address a case in which an allocation resolution is determined in accordance with a maximum number of frequency blocks determined by a maximum-number-of-frequency-blocks determining section 105 in accordance with uplink CQI. It should be noted that components similar to those in the foregoing embodiments are designated by similar reference numerals and detailed description thereof will be omitted.

Figure 13:
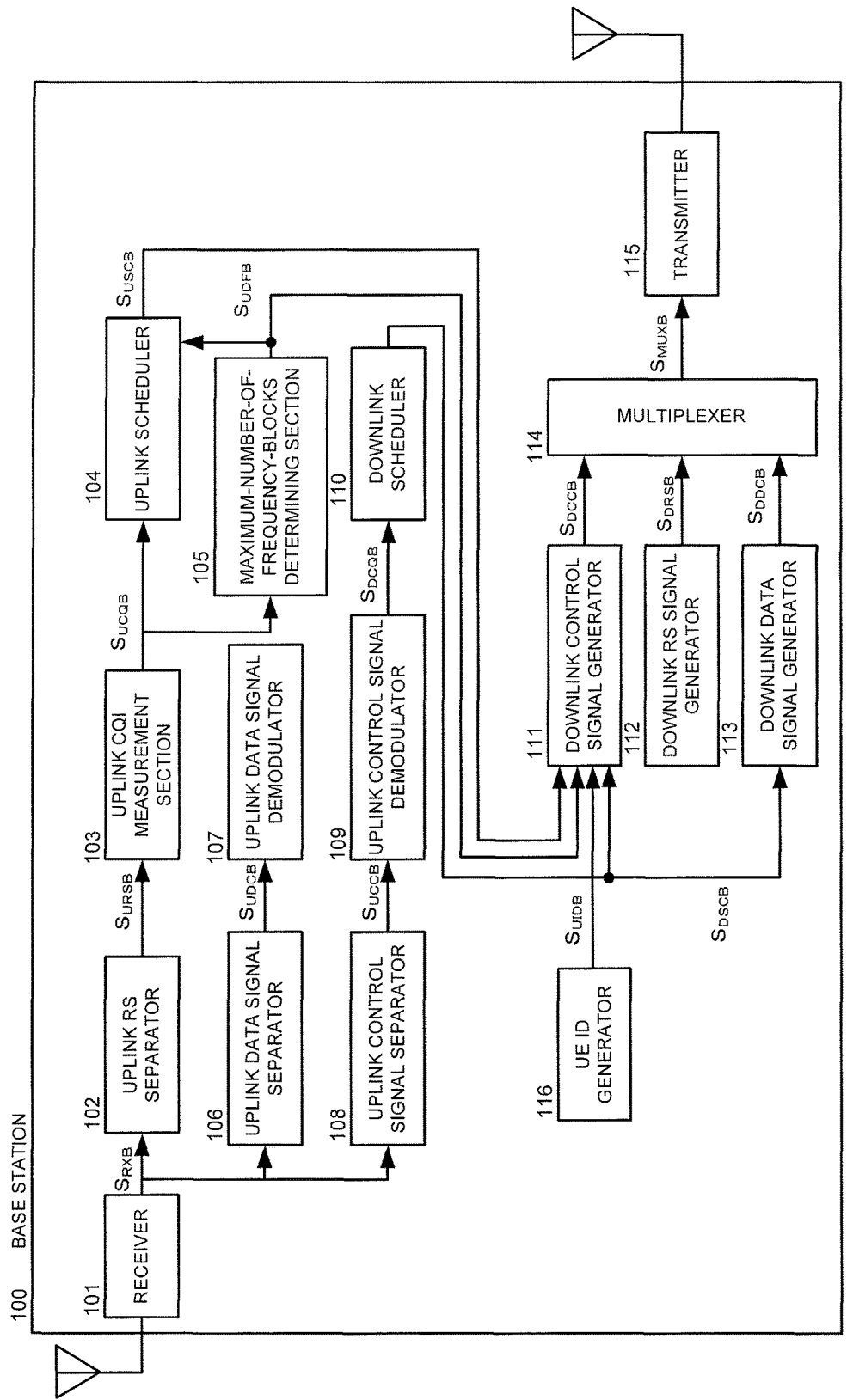
FIG. 13 A block diagram of a base station in a wireless communication system in a third embodiment.

FIG. 13 shows a block diagram of a base station 100 in the present embodiment. This is different from the foregoing embodiments in that a maximum-number-of-frequency-blocks determining section 105 is incorporated.

The maximum-number-of-frequency-blocks determining section 105 receives uplink CQI information $S_{UCQB}$ as input, determines a maximum number of frequency blocks in resource blocks to be allocated to mobile stations, generates a maximum-frequency-block signal $S_{UDFB}$ for each mobile station, and outputs it.

For example, in MC-FDMA in which output of a transmitter DFT (Discrete Fourier Transform) in DFT-spread-OFDM (Discrete Fourier Transform-spread-Orthogonal Frequency Division Multiplexing) is allocated to at least one or more frequency blocks, PAPR becomes higher for a larger number of frequency blocks, and therefore, the PAPR increase in mobile stations at the periphery of a cell becomes problematic unless a limit is imposed on the number of frequency blocks. Thus, based on system information for a base station or mobile station or the like, a maximum allowable number of frequency blocks may be sometimes set for each base station (cell), for each mobile station, or for each mobile station group. Thus, the maximum-number-of-frequency-blocks determining section 105 sets a larger maximum number of frequency blocks in a situation that a greater multi-user diversity effect is desirable (in a situation that the system band is broad, or CQI is good), or sets a smaller maximum number of frequency blocks in a situation that an increase in overhead is desired to be held down (in a situation that the system band is narrow, or CQI is poor).

The uplink scheduler 104 makes uplink scheduling for each mobile station. The uplink scheduler 104 receives uplink CQI information $S_{UCQB}$ and maximum-frequency-block signal $S_{UDFB}$ as input, limits the maximum number of frequency blocks for resource blocks to be allocated within a number represented by the maximum-frequency-block signal $S_{UDFB}$, and makes RB allocation with an allocation resolution corresponding to the maximum-frequency-block signal $S_{UDFB}$. Then, it outputs scheduling information, which is scheduling information representing the positions of the allocated RBs, and maximum number of frequency blocks as UL Scheduling Grant $S_{USCB}$.

Figure 14:
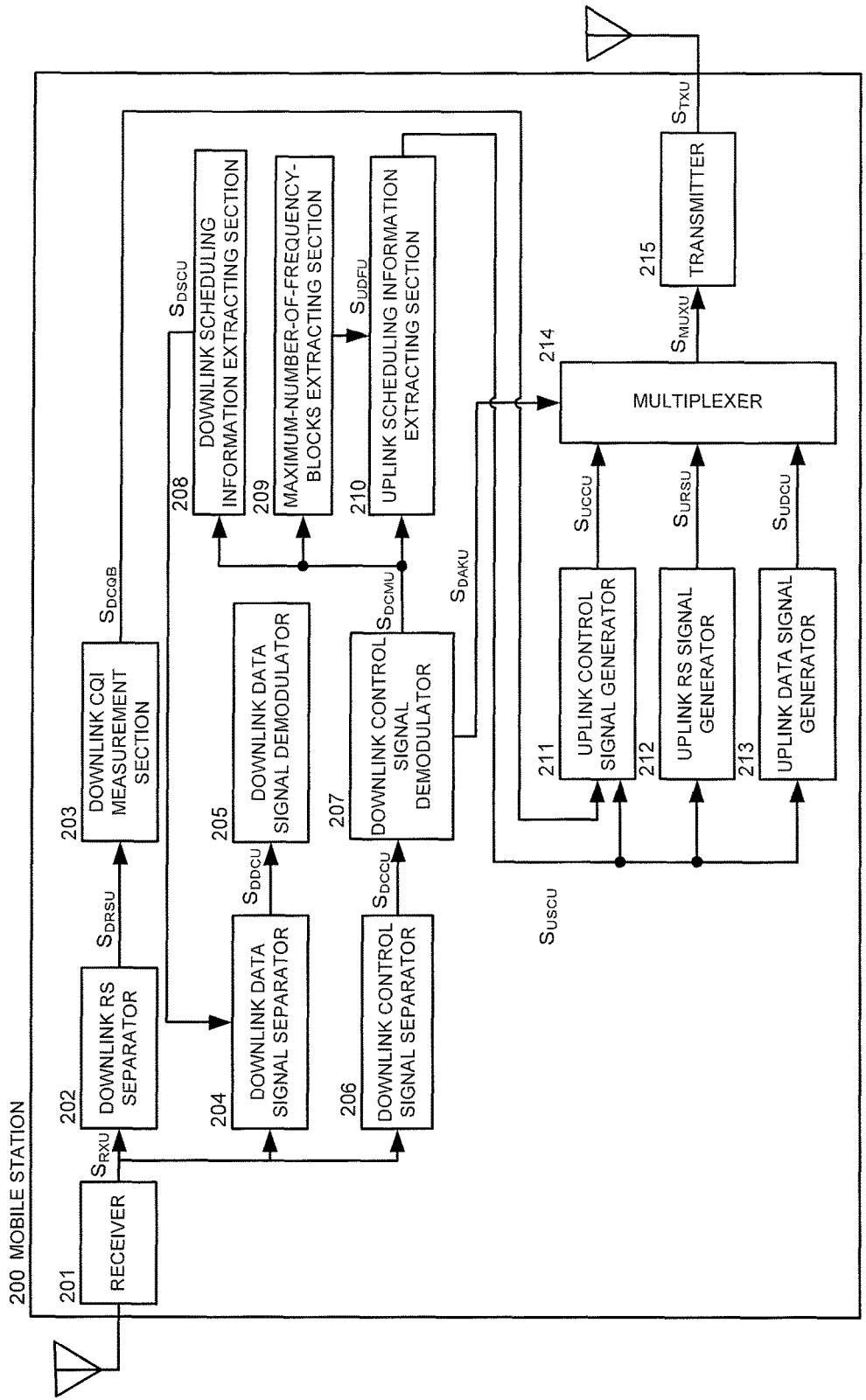
FIG. 14 A block diagram of a mobile station in the wireless communication system in the third embodiment.

Subsequently, a description will be made on the mobile station 200. FIG. 14 shows a block diagram of a mobile station 200 in the present embodiment. This is different from the foregoing embodiments in that a maximum-number-of-frequency-blocks extracting section 209 is incorporated.

The maximum-number-of-frequency-blocks extracting section 209 receives downlink control reproduced signal $S_{DCMU}$ as input, separates therefrom a received maximum-frequency-block signal $S_{UDFU}$ for the mobile station itself, and outputs it.

The uplink scheduling information extracting section 210 extracts, from the downlink control reproduced signal $S_{DCMU}$, UL Scheduling Grant that represents information on allocated uplink RBs. Next, it discriminates an allocation resolution correlated with the received maximum-frequency-block signal $S_{UDFU}$ in a one-to-one correspondence from the received maximum-frequency-block signal $S_{UDFU}$ output from the maximum-number-of-frequency-blocks extracting section 209. It discriminates a tree structure in the Tree-Based method from the allocation resolution, identifies RBs indicated by the uplink RB allocation information in this tree structure, and outputs it as uplink RB allocation decision information $S_{USCU}$.

Figure 15:
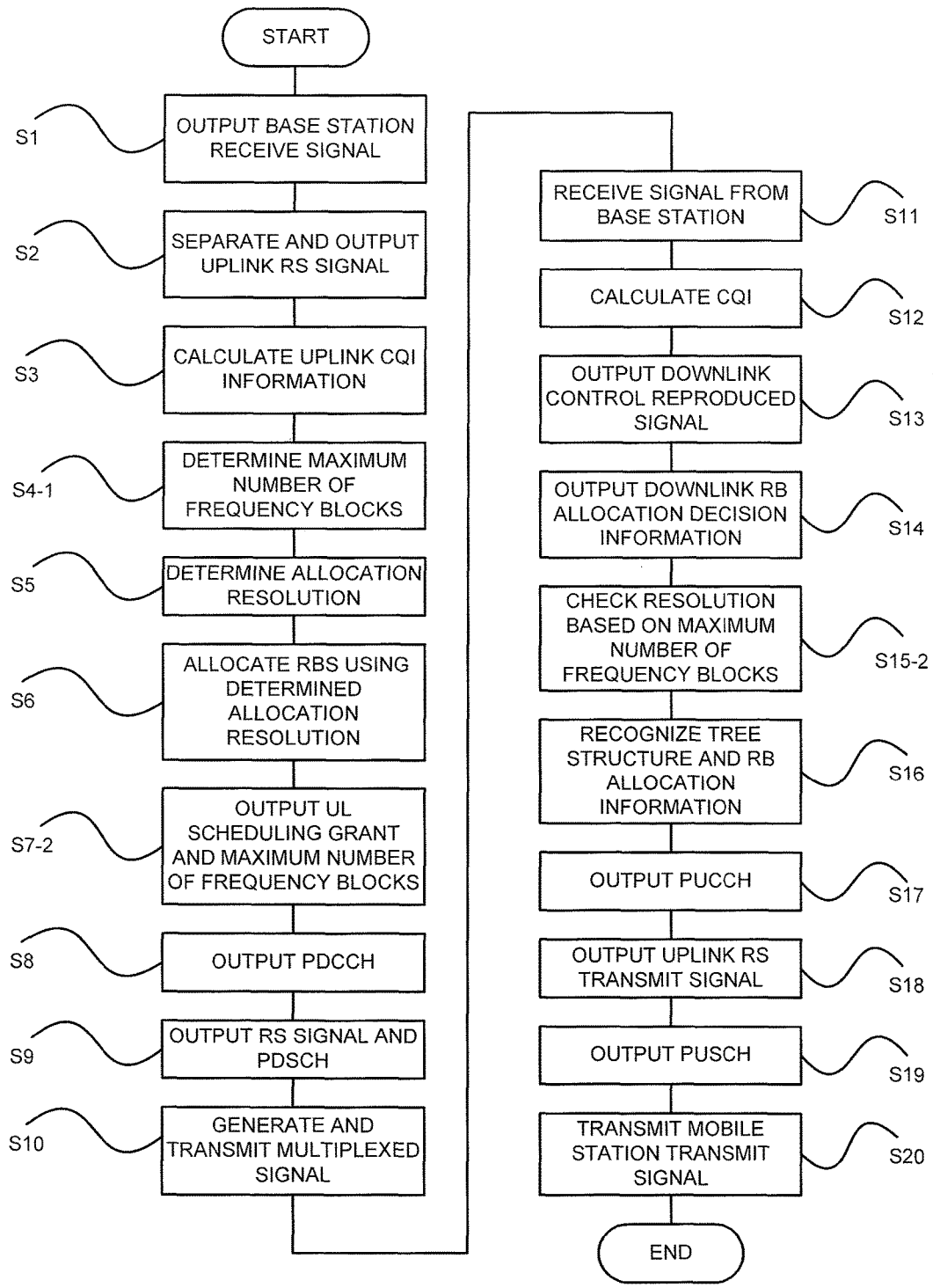
FIG. 15 A flow chart of the third embodiment.

Subsequently, an operation of the present embodiment will be described with reference to a flow chart in FIG. 15.

The receiver 101 in the base station 100 receives a signal from the mobile station 200, establishes uplink synchronization using a guard interval, and outputs a base station receive signal $S_{RXB}$ (Step S1).

The uplink RS (Reference Signal) separator 102 separates from the output base station receive signal $S_{RXB}$ an uplink RS signal $S_{URSB}$ in which uplink RS signals from a plurality of mobile stations are multiplexed, and outputs it (Step S2).

From the uplink RS signals $S_{URSB}$ for a plurality of mobile stations, the uplink CQI measurement section 103 calculates CQI (Channel Quality Indicator) for each mobile station on an RB-by-RB basis, and outputs it as uplink CQI information $S_{UCQB}$ (Step S3).

The maximum-number-of-frequency-blocks determining section 105 determines a maximum number of frequency blocks in resource blocks to be allocated to each mobile station based on the uplink CQI information $S_{UCQB}$, generates a maximum-frequency-block signal $S_{UDFB}$ for each mobile station, and outputs it (Step S4-1).

The uplink scheduler 104 determines an allocation resolution correlated with the maximum number of frequency blocks represented in the maximum-frequency-block signal $S_{UDFB}$ using the correspondence table as shown in FIG. 3 kept in the equipment itself, whereby it also determines a structure in the Tree-Based method, and sets the number of bits for UL Scheduling Grant as a number of bits in accordance with the determined structure in the Tree-Based method (Step S5).

RBs are allocated with resource blocks in a number equal to the determined allocation resolution and within the determined number of frequency blocks (Step S6).

Next, the uplink scheduler 104 outputs scheduling information representing positions of the allocated RBs, and the maximum number of frequency blocks in a specified number of bits as UL Scheduling Grant $S_{USCB}$ (Step S7-2).

The downlink control signal generator 111 is supplied as input with the UL Scheduling Grant $S_{USCB}$, DL Scheduling Grant $S_{DSCB}$, mobile station identification information $S_{UIDB}$ and received maximum-frequency-block signal $S_{UDFB}$, multiplexes these input signals to generate a downlink control signal as PDCCH (Physical Downlink Control Channel) $S_{DCCB}$, and outputs it (Step S8).

The downlink RS signal generator 112 generates a downlink RS signal as a downlink RS signal $S_{DRSB}$, and outputs it; the downlink data signal generator 113 receives the DL Scheduling Grant $S_{DSCB}$ as input, multiplexes downlink data signals from a plurality of mobile stations together in accordance with an RB pattern indicated by the DL Scheduling Grant $S_{DSCB}$, generates Physical Downlink Shared Channel (PDSCH) $S_{DDCB}$, and outputs it (Step S9).

The multiplexer 114 receives the PDCCH $S_{DCCB}$, RS signal $S_{DRSB}$ and PDSCH $S_{DDCB}$ as input, and multiplexes these signals to generate a downlink multiplexed signal $S_{MUXB}$; the transmitter 115 generates a transmit signal $S_{TXB}$ from the downlink multiplexed signal $S_{MUXB}$, and outputs it (Step S10).

The receiver 201 in the mobile station 200 receives a signal from the base station 100, establishes downlink synchronization using a guard interval, and outputs a mobile station receive signal $S_{RXU}$ (Step S11).

The downlink RS (Reference Signal) separator 202 receives the mobile station receive signal $S_{RXU}$ as input, and separates therefrom a downlink RS signal $S_{DRSU}$ in which the downlink RS signals are multiplexed; the downlink CQI measurement section 203 receives the downlink RS signal $S_{DRSU}$ as input, calculates CQI on an RB-by-RB basis, and outputs it as downlink CQI information $S_{DCQB}$ (Step S12).

The downlink control signal separator 206 receives the mobile station receive signal $S_{RXU}$ as input, and separates therefrom PDCCH $S_{DCCU}$ in which downlink control signals from a plurality of mobile stations are multiplexed; the downlink control signal demodulator 207 demodulates the PDCCH $S_{DCCU}$ to reproduce a downlink control signal, separates therefrom a result of reproduction in which mobile station identification information corresponding to the mobile station itself is multiplexed, and outputs it as a downlink control reproduced signal $S_{DCMU}$ (Step S13).

The downlink scheduling information extracting section 208 receives the downlink control reproduced signal $S_{DCMU}$ as input, extracts therefrom downlink RB allocation decision information $S_{DSCU}$ corresponding to downlink resource allocation information, and outputs it (Step S14).

The maximum-number-of-frequency-blocks extracting section 209 receives the downlink control reproduced signal $S_{DCMU}$ as input, separates therefrom the received maximum-frequency-block signal $S_{UDFU}$ for the mobile station itself, and outputs it; the uplink scheduling information extracting section 210 checks a value of the allocation resolution from the received maximum-frequency-block signal $S_{UDFU}$ (Step S15-2).

Next, it discriminates a tree structure in the Tree-Based method from the value of the allocation resolution, identifies RBs indicated by the uplink RB allocation information in this tree structure, and outputs it as uplink RB allocation decision information $S_{USCU}$ (Step S16).

The uplink control signal generator 211 receives the uplink RB allocation decision information $S_{USCU}$ and downlink CQI information $S_{DCQB}$ as input, generates Physical Uplink Control Channel (PUCCH) $S_{UCCU}$ in which the downlink CQI information $S_{DCQB}$ is multiplexed with a predetermined resource for a control signal indicated by the uplink RB allocation decision information $S_{USCU}$, and outputs it (Step S17).

The uplink RS signal generator 212 receives the uplink RB allocation decision information $S_{USCU}$ as input, generates an uplink RS transmit signal $S_{URSU}$ using a predetermined resource for RS in the uplink RB allocation decision information $S_{USCU}$, and outputs it (Step S18).

The uplink data signal generator 213 receives the uplink RB allocation decision information $S_{USCU}$ as input, generates Physical Uplink Shared Channel (PUSCH) $S_{UDCU}$ using a predetermined resource for a data signal in the uplink RB allocation decision information $S_{USCU}$, and outputs it (Step S19).

The multiplexer 214 receives the PUCCH $S_{UCCU}$, uplink RS transmit signal $S_{URSU}$, PUSCH $S_{UDCU}$ and downlink control signal decision signal $S_{DAKU}$ as input, and multiplexes these signals to generate a mobile station multiplexed signal $S_{MUXU}$; the transmitter 215 transmits the mobile station transmit signal $S_{MUXU}$ to the base station 100 (Step S20).

While a case in which the maximum number of frequency blocks is incorporated in UL Scheduling Grant has been addressed in the description above, the maximum number of frequency blocks is notified by a signal mapped to Physical Downlink Shared Channel (PDSCH), which is generally referred to as Physical Broadcast Channel (PBCH) or Dynamic Broadcast Channel (DBCH), in a case that the maximum number of frequency blocks is determined as a cell-specific value. Moreover, for a UE-specific case, it is notified by information on Higher layer signaling mapped to PDSCH. In such a case, there is no need to incorporate the maximum number of frequency blocks into UL Scheduling Grant.

Moreover, while a case in which the maximum number of frequency blocks is incorporated in UL Scheduling Grant has been addressed in the description above, information on the allocation resolution, in place of the maximum number of frequency blocks, may be incorporated. In this case, the uplink scheduling information extracting section 210 is configured to extract UL Scheduling Grant from the downlink control reproduced signal $S_{DCMU}$ to discriminate the allocation resolution.

A case in which the maximum frequency block is determined in accordance with uplink CQI has been addressed in the description above; now another method for determining a maximum frequency block will be described below.

First, a configuration will be described in which the maximum-number-of-frequency-blocks determining section determines the maximum number of frequency blocks according to the location of the mobile station and base station.

Figure 16:
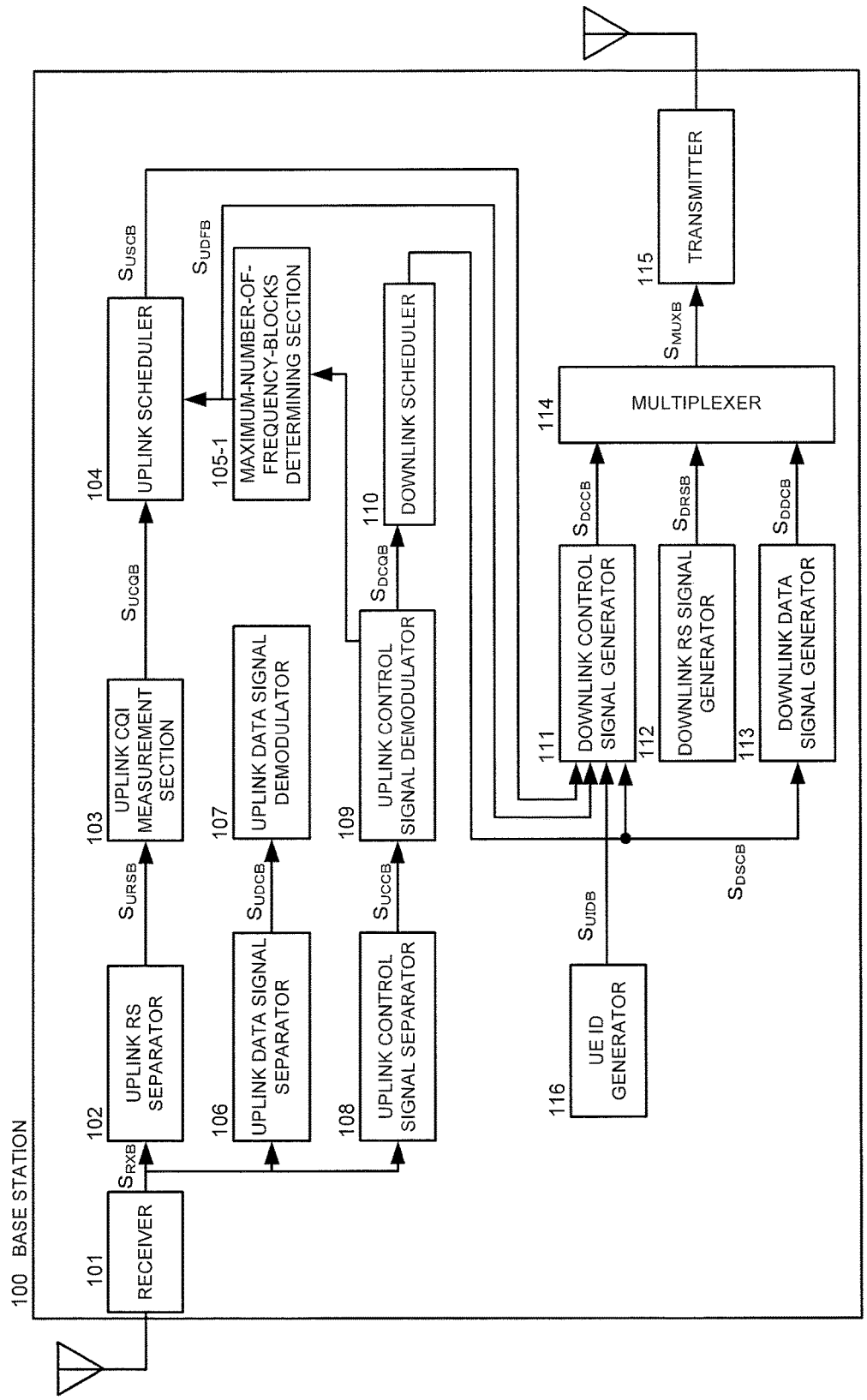
FIG. 16 Another block diagram of a base station in the wireless communication system in the third embodiment.

FIG. 16 shows a block diagram of a base station 100 for determining the maximum number of frequency blocks according to the location of the mobile station and base station.

In the base station 100, the uplink control signal demodulator 109 demodulates PUCCH $S_{UCCB}$, and outputs a downlink CQI measurement signal $S_{UCQB}$, which is a result of measurement of downlink CQI transmitted by a plurality of mobile stations, and received mobile station localization information $S_{ULCB}$ representing the location of the mobile station.

A maximum-number-of-frequency-blocks determining section 105-1 receives the received mobile station localization information $S_{ULCB}$ as input, determines a maximum number of frequency blocks in frequency resources to be allocated to each mobile station from the location of the mobile station represented by the received mobile station localization information $S_{ULCB}$, generates a maximum-frequency-block signal $S_{UDFB}$ for each mobile station, and outputs it. In particular, the maximum number of frequency blocks is determined and generated to have a smaller value for a user located farther away from the base station.

Figure 17:
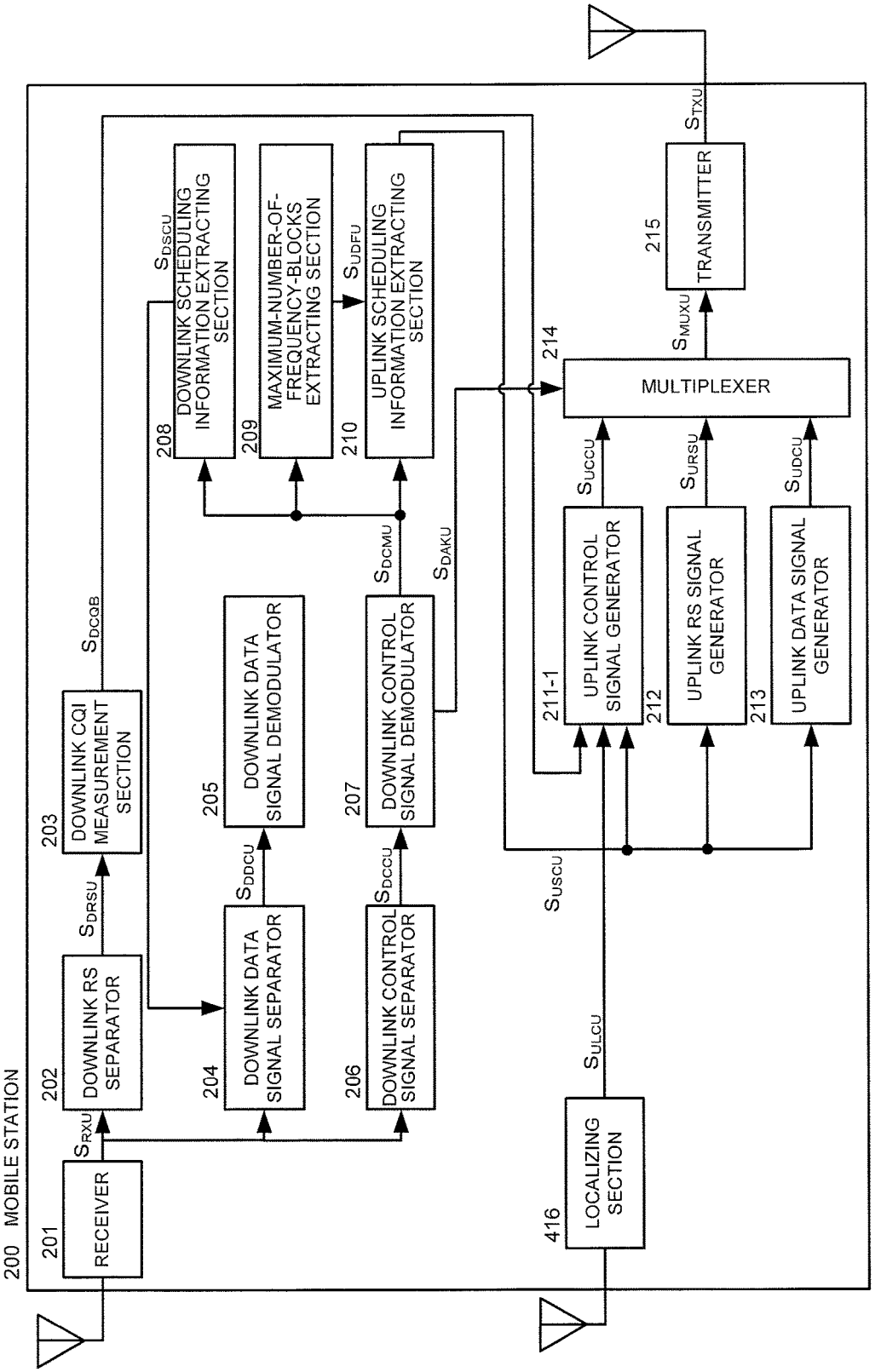
FIG. 17 Another block diagram of a mobile station in the wireless communication system in the third embodiment.

FIG. 17 shows a block diagram of a mobile station 200 when a maximum number of frequency blocks is determined in accordance with the location of the mobile station and base station.

In the mobile station 200, a localizing section 416 has a function of locating the mobile station using a signal from a GPS signal satellite, and it receives a signal from the GPS satellite, locates the mobile station 200, generates mobile station localization information $S_{ULCU}$, and outputs it.

An uplink control signal generator 211-1 receives the uplink RB allocation decision information $S_{USCU}$, downlink CQI information $S_{DCQB}$, and mobile station localization information $S_{ULCU}$ as input, generates PUCCH $S_{UCCU}$ using a predetermined resource for a control signal in resources indicated by the uplink RB allocation decision information $S_{USCU}$ along with the downlink CQI information $S_{DCQB}$ and mobile station localization information $S_{ULCU}$, and outputs it.

By the aforementioned configuration, RBs are allocated with a lower allocation resolution to a mobile station having a smaller maximum number of frequency blocks, and with a higher allocation resolution to a mobile station having a larger maximum number of frequency blocks.

Subsequently, a case will be described in which the maximum-number-of-frequency-blocks determining section determines a maximum number of frequency blocks in accordance with the power headroom, which represents an increasable transmit power in a mobile station.

Figure 18:
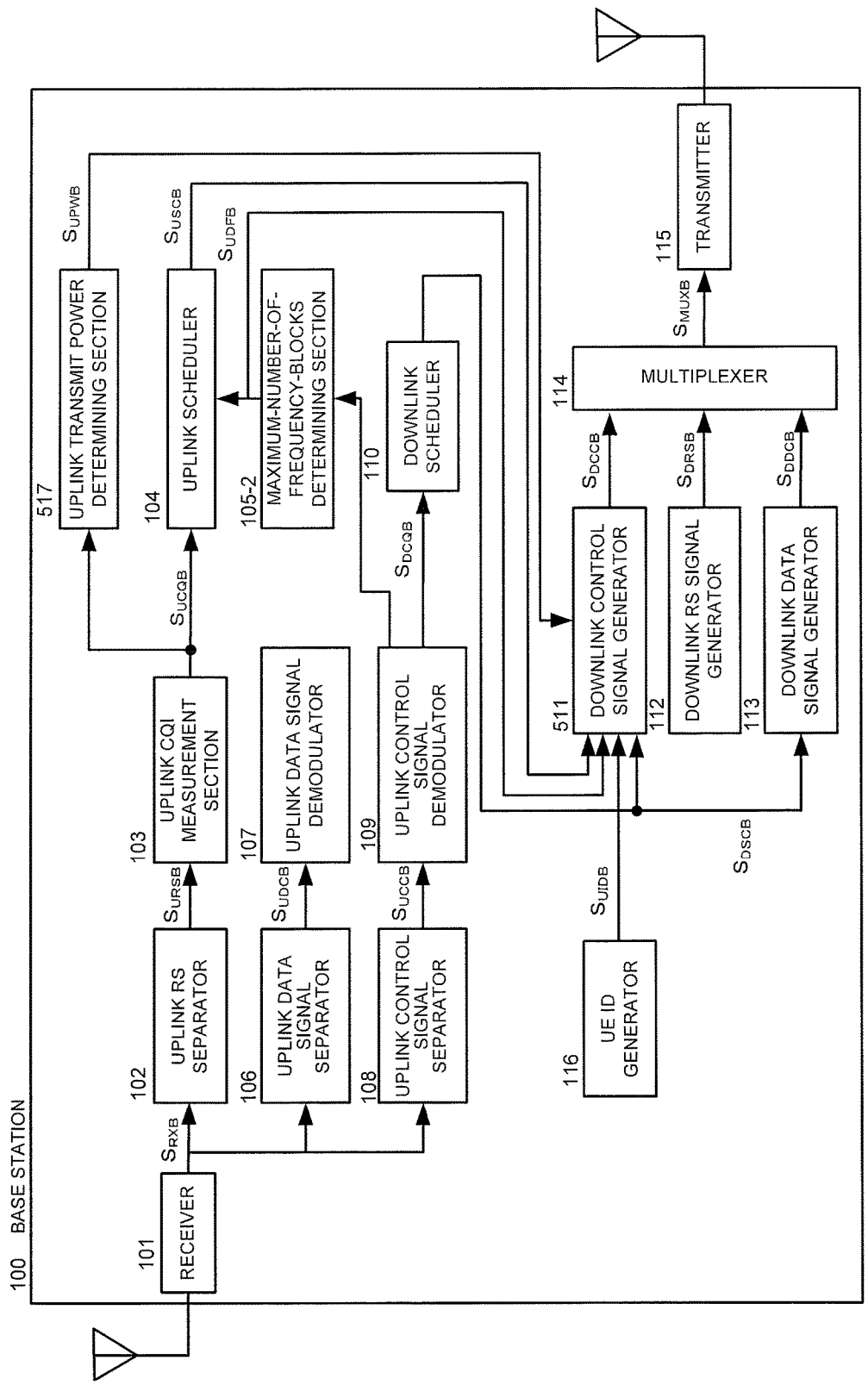
FIG. 18 Another block diagram of a base station in the wireless communication system in the third embodiment.

FIG. 18 shows a block diagram of a base station 100 in which the maximum number of frequency blocks is determined in accordance with the power headroom, which represents an increasable transmit power in a mobile station.

In the base station 100, an uplink transmit power determining section 517 receives the uplink CQI information $S_{UCQB}$ as input, calculates a transmit power value for the mobile station required to satisfy a required receive power, generates uplink transmit power setting information $S_{UPWB}$, and outputs it.

The uplink control signal demodulator 109 demodulates the uplink control signal $S_{UCCB}$, and outputs a downlink CQI measurement signal $S_{DCQB}$, which is a result of measurement of downlink CQI transmitted by a plurality of mobile stations, and mobile station power headroom received information $S_{UHRB}$.

A maximum-number-of-frequency-blocks determining section 105-2 receives the power headroom received information $S_{UHRB}$ as input, determines a maximum number of frequency blocks in frequency resources to be allocated to each mobile station based on the power headroom received information $S_{UHRB}$, generates a maximum-frequency-block signal $S_{UDFB}$ for the mobile station, and outputs it. In particular, for example, setting the initial value of the maximum number of frequency blocks as one, and in a case that the value represented by the power headroom received information $S_{UHRB}$ exceeds a threshold electric power $P_{DFUP}$ ($P_{DFUP}$ is a positive real number), the value of the maximum number of frequency blocks is incremented by one. In a case that the value represented by the power headroom received information $S_{UHRB}$ is zero and the maximum number of frequency blocks is two or more, the value of the maximum number of frequency blocks is decremented by one. That is, in a case that the transmit power has an extra capacity, the maximum number of frequency blocks is increased to increase the number of allocatable frequency blocks, and enhance the gain in frequency domain channel dependent scheduling. In a case that the transmit power has no extra capacity and is power-limited, the maximum number of frequency blocks is reduced to transmit signals with higher electric power density.

The downlink control signal generator 511 receives the mobile station identification information $S_{UIDB}$, UL Scheduling Grant $S_{USCB}$, DL Scheduling Grant $S_{DSCB}$, maximum-frequency-block signal $S_{UDFB}$ and uplink transmit power setting information $S_{UPWB}$ as input, generates a downlink control signal in which these signals are multiplexed as PDCCH $S_{DCCB}$, and outputs it.

Figure 19:
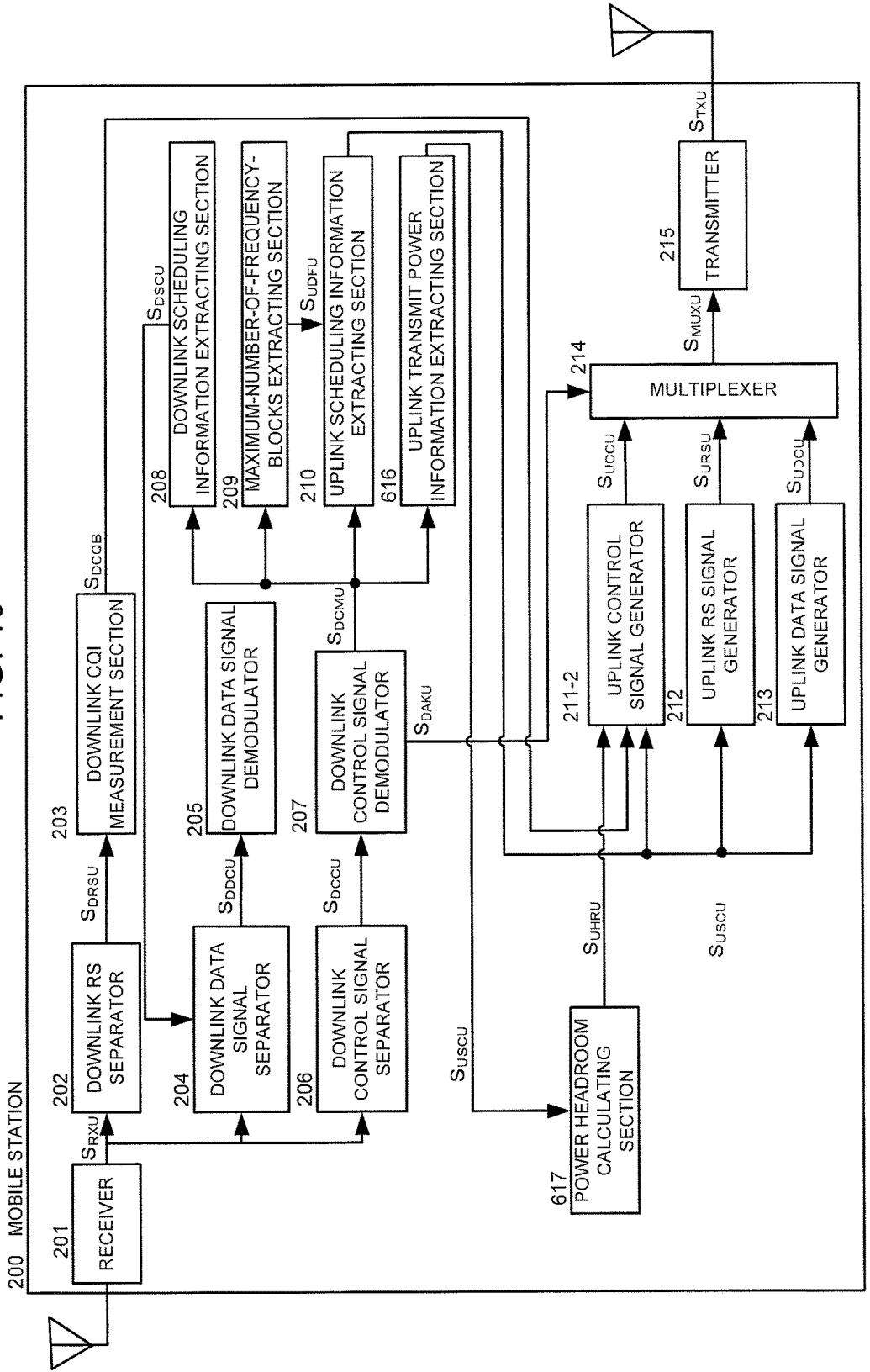
FIG. 19 Another block diagram of a mobile station in the wireless communication system in the third embodiment.

FIG. 19 shows a block diagram of a mobile station 200 in which the maximum number of frequency blocks is determined in accordance with the power headroom, which represents an increasable transmit power in the mobile station.

In the mobile station 200, an uplink transmit power information extracting section 616 extracts, from the downlink control reproduced signal $S_{DCMU}$, received uplink transmit power setting value information $S_{UPWU}$ that represents the uplink transmit power value in the mobile station and is notified by the base station, and outputs it.

A power headroom calculating section 617 receives the received uplink transmit power setting value information $S_{UPWU}$ as input, subtracts the received uplink transmit power setting value information $S_{UPWU}$ from the maximum transmit power value transmittable by the mobile station, and outputs the resulting value as mobile station power headroom information $S_{UHRU}$. The mobile station power headroom information $S_{UHRU}$ represents the remaining electric power with which the mobile station can perform additional transmission after transmission with an electric power represented by the received uplink transmit power setting value information $S_{UPWU}$.

An uplink control signal generator 211-2 receives the uplink RB allocation decision information $S_{USCU}$, downlink CQI information $S_{DCQB}$, and mobile station power headroom information $S_{UHRU}$ as input, generates PUCCH $S_{UCCU}$ using a predetermined resource for a control signal in resources represented by the uplink RB allocation decision information $S_{USCU}$ along with the downlink CQI information $S_{DCQB}$ and mobile station power headroom information $S_{UHRU}$, and outputs it.

By the aforementioned configuration, RBs are allocated with a lower allocation resolution to a mobile station having a smaller maximum number of frequency blocks, and with a higher allocation resolution to a mobile station having a larger maximum number of frequency blocks.

As described above, in accordance with the present embodiment, in the Tree-Based method, RBs are allocated with a lower allocation resolution to a mobile station having a smaller maximum number of frequency blocks, and with a higher allocation resolution to a mobile station having a larger maximum number of frequency blocks, so that an increase in the amount of signaling due to an increase of the number of frequency blocks can be prevented.

Fourth Embodiment

The first and second embodiments have addressed a case in which an allocation resolution is determined in accordance with the number of frequency blocks determined by the scheduler, and the third embodiment has addressed a case in which an allocation resolution is determined in accordance with the maximum number of frequency blocks determined by the maximum-number-of-frequency-blocks determining section. The following embodiment is characterized in checking a sequence of resource blocks allocated in accordance with any one of the embodiments described above, and in a case that transmission may be made with a number of bits smaller than that for determining information representing the allocated resource blocks, performing transmission with a smaller number of bits. It should be noted that components similar to those in the foregoing embodiment are designated by similar reference numerals and detailed description thereof will be omitted.

Figure 20:
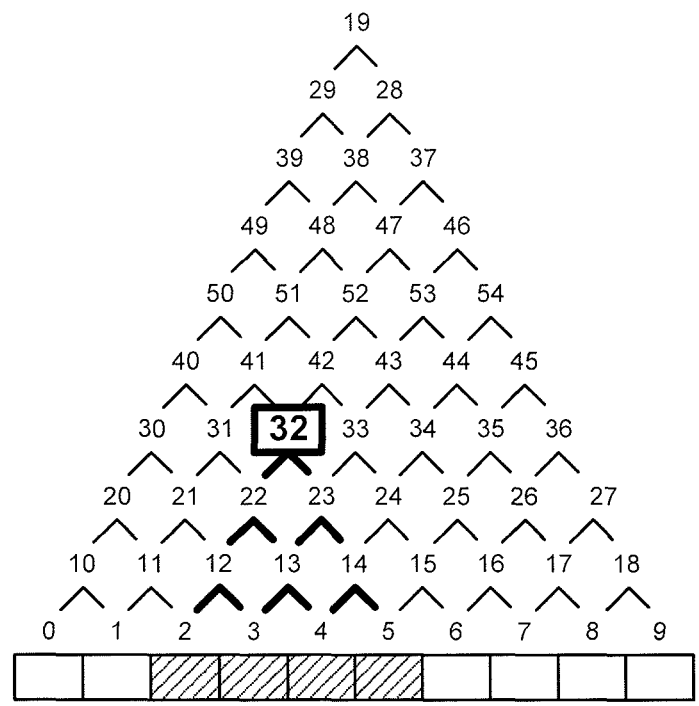
FIG. 20 A diagram for explaining resource block allocation.

For example, assuming that the number of frequency blocks or maximum number of frequency blocks is one, the allocation resolution is set as one with reference to the correspondence table in FIG. 3. Now assume that as a result of an act of the scheduler allocating resource blocks with a number of frequency blocks of one and an allocation resolution of one, resource blocks at positions numbered "2," "3," "4" and "5" are allocated as shown in FIG. 20. In this case, according to the embodiments described above, a value "32" within 1-55 (six bits) is used to make denotation in the Tree-Based method.

Figure 21:
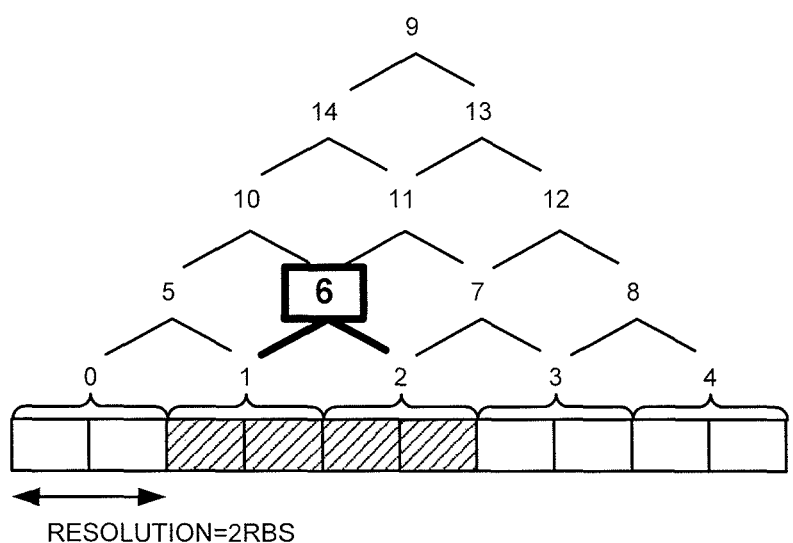
FIG. 21 A diagram for explaining resource block allocation.

However, in actuality, as shown in FIG. 21, it may be denoted in the Tree-Based method using a value "6" within 1-15 that can be denoted by four bits. In other words, resource block allocation may be denoted in the Tree-Based method with a smaller number of bits.

The uplink scheduler 104 in the present embodiment checks a sequence of allocated resource blocks, and in a case that transmission may be made with a number of bits smaller than that for determining information representing the allocated resource blocks, updates the value of the allocation resolution determined once and outputs UL Scheduling Grant in a number of bits in accordance with the updated value of the allocation resolution.

Figure 22:
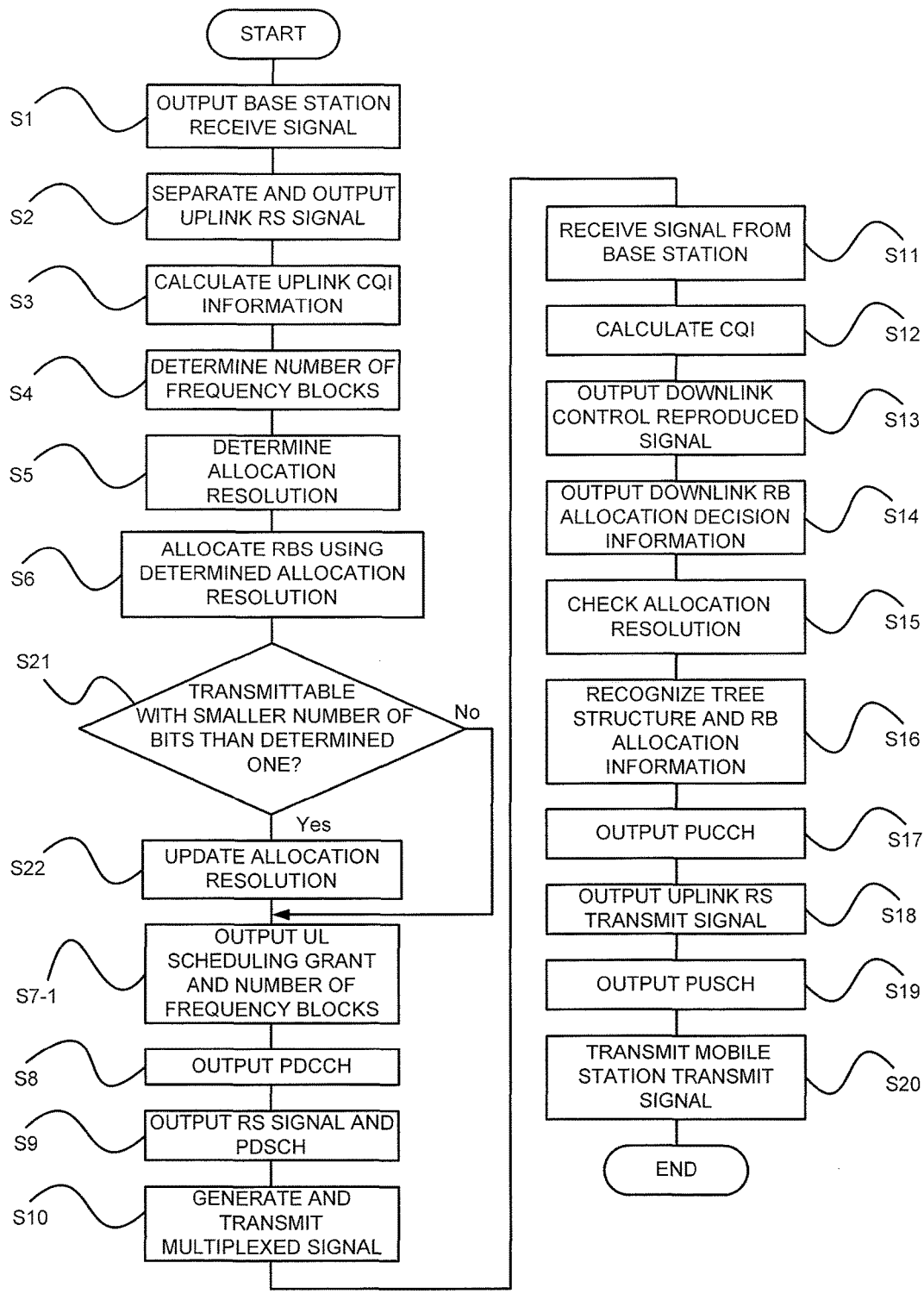
FIG. 22 A flow chart of a fourth embodiment.

Subsequently, an operation of the present embodiment will be described with reference to a flow chart in FIG. 22. While the following description will be made with reference to the first embodiment, it may be based on the third embodiment.

The receiver 101 in the base station 100 receives a signal from the mobile station 200, establishes uplink synchronization using a guard interval, and outputs a base station receive signal $S_{RXB}$ (Step S1).

The uplink RS (Reference Signal) separator 102 separates from the output base station receive signal $S_{RXB}$ an uplink RS signal $S_{URSB}$ in which uplink RS signals from a plurality of mobile stations are multiplexed, and outputs it (Step S2).

From the uplink RS signals $S_{URSB}$ for a plurality of mobile stations, the uplink CQI measurement section 103 calculates CQI (Channel Quality Indicator) for each mobile station on an RB-by-RB basis, and outputs it as uplink CQI information $S_{UCQB}$ (Step S3).

The uplink scheduler 104 determines a number of frequency blocks for resources to be allocated to each mobile station based on the uplink CQI information $S_{UCQB}$ for each mobile station (Step S4). An allocation resolution correlated with the determined number of frequency blocks is determined using the correspondence table as shown in FIG. 3 kept in the equipment itself (Step S5).

RBs are allocated with resource blocks in a number equal to the determined allocation resolution and with the determined number of frequency blocks (Step S6).

From a sequence of the allocated RBs, decision is made as to whether transmission may be made with a number of bits smaller than that for determining information representing the allocated resource blocks (Step S21). In a case that transmission may be made with a number of bits smaller than that for determining information representing the allocated resource blocks, the value of the allocation resolution determined once is updated, and the number of bits is set to that in accordance with the allocation resolution from the updated number of bits for UL Scheduling Grant (Step S22). On the other hand, in a case that transmission cannot be made with a number of bits smaller than that for determining information representing the allocated resource blocks, the flow goes to Step S7-1.

Next, the uplink scheduler 104 outputs scheduling information representing positions of the allocated RBs and value of the allocation resolution in a specified number of bits as UL Scheduling Grant $S_{USCB}$, and outputs the number of frequency blocks as $S_{UDFB}$ (Step S7-1).

The downlink control signal generator 111 is supplied as input with the UL Scheduling Grant $S_{USCB}$, DL Scheduling Grant $S_{DSCB}$, mobile station identification information $S_{UIDB}$ and frequency block signal $S_{UDFB}$, multiplexes these input signals to generate a downlink control signal as PDCCH (Physical Downlink Control Channel) $S_{DCCB}$, and outputs it (Step S8).

The downlink RS signal generator 112 generates a downlink RS signal as a downlink RS signal $S_{DRSB}$; the downlink data signal generator 113 multiplexes downlink data signals from a plurality of mobile stations together in accordance with an RB pattern indicated by the DL Scheduling Grant $S_{DSCB}$, generates Physical Downlink Shared channel (PDSCH) $S_{DDCB}$, and outputs it (Step S9).

The multiplexer 114 receives the PDCCH $S_{DCCB}$, RS signal $S_{DRSB}$ and PDSCH $S_{DDCB}$ as input, and multiplexes these signals to generate a downlink multiplexed signal $S_{MUXB}$; the transmitter 115 generates a transmit signal $S_{TXB}$ from the downlink multiplexed signal $S_{MUXB}$, and transmits it (Step S10).

The receiver 201 in the mobile station 200 receives a signal from the base station 100, establishes downlink synchronization using a guard interval, and outputs a mobile station receive signal $S_{RXU}$ (Step S11).

The downlink RS (Reference Signal) separator 202 receives the mobile station receive signal $S_{RXU}$ as input, separates therefrom a downlink RS signal $S_{DRSU}$ in which the downlink RS signals are multiplexed, and outputs it; the downlink CQI measurement section 203 calculates CQI from the downlink RS signal $S_{DRSU}$ on an RB-by-RB basis, and outputs it as downlink CQI information $S_{DCQB}$ (Step S12).

The downlink control signal separator 206 receives the mobile station receive signal $S_{RXU}$ as input, and separates therefrom PDCCH $S_{DCCU}$ in which downlink control signals from a plurality of mobile stations are multiplexed; the downlink control signal demodulator 207 demodulates the PDCCH $S_{DCCU}$ to reproduce a downlink control signal, separates therefrom a result of reproduction in which mobile station identification information corresponding to the mobile station itself is multiplexed, and outputs it as a downlink control reproduced signal $S_{DCMU}$ (Step S13).

The downlink scheduling information extracting section 208 receives the downlink control reproduced signal $S_{DCMU}$ as input, extracts therefrom downlink RB allocation decision information $S_{DSCU}$ corresponding to downlink resource allocation information, and outputs it (Step S14).

The uplink scheduling information extracting section 210 extracts, from the downlink control reproduced signal $S_{DCMU}$, UL Scheduling Grant, which represents information on allocated uplink RBs, and checks the value of the allocation resolution (Step S15).

Next, it discriminates a tree structure in the Tree-Based method from the value of the allocation resolution, identifies RBs indicated by the uplink RB allocation information in this tree structure, and outputs it as uplink RB allocation decision information $S_{USCU}$ (Step S16).

The uplink control signal generator 211 receives the uplink RB allocation decision information $S_{USCU}$ and downlink CQI information $S_{DCQB}$ as input, generates Physical Uplink Control Channel (PUCCH) $S_{UCCU}$ in which the downlink CQI information $S_{DCQB}$ is multiplexed with a predetermined resource for a control signal indicated by the uplink RB allocation decision information $S_{USCU}$, and outputs it (Step S17).

The uplink RS signal generator 212 receives the uplink RB allocation decision information $S_{UDCU}$ as input, generates an uplink RS transmit signal $S_{URSU}$ using a predetermined resource for RS in the uplink RB allocation decision information $S_{USCU}$, and outputs it (Step S18).

The uplink data signal generator 213 receives the uplink RB allocation decision information $S_{USCU}$ as input, generates Physical Uplink Shared Channel (PUSCH) $S_{UDCU}$ using a predetermined resource for a data signal in the uplink RB allocation decision information $S_{USCU}$, and outputs it (Step S19).

The multiplexer 214 receives the PUCCH $S_{UCCU}$, uplink RS transmit signal $S_{URSU}$, PUSCH $S_{UDCU}$ and downlink control signal decision signal $S_{DAKU}$ as input, and multiplexes these signals to generate a mobile station multiplexed signal $S_{MUXU}$; the transmitter 215 transmits the mobile station transmit signal $S_{MUXU}$ to the base station 100 (Step S20).

While the explanation has been made in the preceding description with reference to a configuration in which, after allocating resource blocks with a determined allocation resolution, a check is made as to whether information representing the allocated resource blocks can be transmitted with a smaller number of bits, another configuration may be contemplated in which, after simply allocating resource blocks, a check is made as to whether information representing the allocated resource blocks can be transmitted with a smaller number of bits.

According to the present embodiment, since a sequence of allocated resource blocks is checked to confirm whether transmission may be made with a smaller number of bits than that for determining information representing the allocated resource blocks, UL Scheduling Grant can be reliably transmitted with a smaller number of bits.

While a mode in which uplink resource blocks are allocated has been described in the embodiments above, the mode may be one such that downlink resource blocks are allocated. In such a case, the number of frequency blocks or maximum number of frequency blocks may be information varying in accordance with a communication environment, such as, for example, the cell size, system bandwidth, coverage of a base station, channel quality information measured by a downlink reference signal, bandwidth of downlink data signals, and number of levels in multi-level modulation for downlink data signals, or code rate. Moreover, since the aforementioned cell size is determined by information affecting the communication environment such as the location of a base station, distance between base stations, and interference power, the number of frequency blocks may be selected using such information.

Furthermore, a mode in which the mode of allocating uplink resource blocks is combined with the mode of allocating downlink resource blocks may be contemplated.

In addition, while it is possible to configure the mobile station and base station in the present invention described above by hardware, they may be implemented by a computer program as obvious from the preceding description.

A processor operated by programs stored in a program memory implements functions and operations similar to those in the embodiments described above. It should be noted that part of functions of the embodiments described above may be implemented by a computer program.

While the present invention has been described with reference to several embodiments, it is not limited thereto. Various modifications that those skilled in the art can appreciate may be made to the configuration or details of the present invention within a scope of the present invention.

The present application claims priority based on Japanese Patent Application No. 2008-161752 filed on Jun. 20, 2008, disclosure of which is incorporated herein in its entirety.

What is claimed is:

1. A resource allocating method comprising:
transmitting, by a base station, a downlink control signal comprising type information indicating one of:
a first uplink resource allocation type for allocating one or more consecutive resource blocks, and
a second uplink resource allocation type for allocating a plurality of resource block groups, each one of the plurality of resource block groups including a plurality of consecutive resource blocks;
if the type information indicates the first uplink resource allocation type:
transmitting, by the base station, first uplink resource allocation information indicating the one or more consecutive resource blocks, and
receiving, by the base station, first uplink data using the one or more consecutive resource blocks, and
if the type information indicates the second uplink resource allocation type:
transmitting, by the base station, second uplink resource allocation information indicating the plurality of resource block groups, and
receiving, by the base station, second uplink data using the plurality of resource block groups,
wherein an allocation unit of the one or more consecutive resource blocks indicated by the first uplink resource allocation information is smaller than an allocation unit of each one of the plurality of resource block groups indicated by the second uplink resource allocation information,
wherein at least one resource block, which is not included in the plurality of resource block groups is located between each two of the plurality of resource block groups.

2. The resource allocating method according to claim 1, wherein a number of resource blocks included in a first resource block group of the plurality of resource block groups is equal to a number of resource blocks included in a second resource block group of the plurality of resource block groups.

3. The resource allocating method according to claim 1, wherein a number of resource blocks included in a first resource block group of the plurality of resource block groups is different from a number of resource blocks included in a second resource block group of the plurality of resource block groups.

4. The resource allocating method according to claim 1, wherein the allocation unit of the one or more consecutive resource blocks indicated by the first uplink resource allocation information is one resource block and the allocation unit of each one of the plurality of resource block groups indicated by the second uplink resource allocation information is a plurality of resource blocks.

5. The resource allocating method according to claim 1, wherein the allocation unit of each one of the plurality of resource block groups corresponds to system bandwidth.

6. A resource allocating method comprising:
receiving, by a user equipment, a downlink control signal comprising type information indicating one of:
a first uplink resource allocation type for allocating one or more consecutive resource blocks, and
a second uplink resource allocation type for allocating a plurality of resource block groups, each one of the plurality of resource block groups including a plurality of consecutive resource blocks;
if the type information indicates the first uplink resource allocation type:
receiving, by the user equipment, first uplink resource allocation information indicating the one or more consecutive resource blocks, and
transmitting, by the user equipment, first uplink data using the one or more consecutive resource blocks, and
if the type information indicates the second uplink resource allocation type:
receiving, by the user equipment, second uplink resource allocation information indicating the plurality of resource block groups, and
transmitting, by the user equipment, second uplink data using the plurality of resource block groups,
wherein an allocation unit of the one or more consecutive resource blocks indicated by the first uplink resource allocation information is smaller than an allocation unit of each one of the plurality of resource block groups indicated by the second uplink resource allocation information,
wherein at least one resource block, which is not included in the plurality of resource block groups is located between each two of the plurality of resource block groups.

7. The resource allocating method according to claim 6, wherein a number of resource blocks included in a first resource block group of the plurality of resource block groups is equal to a number of resource blocks included in a second resource block group of the plurality of resource block groups.

8. The resource allocating method according to claim 6, wherein a number of resource blocks included in a first resource block group of the plurality of resource block groups is different from a number of resource blocks included in a second resource block group of the plurality of resource block groups.

9. The resource allocating method according to claim 6, wherein the allocation unit of the one or more consecutive resource blocks indicated by the first uplink resource allocation information is one resource block and the allocation unit of each one of the plurality of resource block groups indicated by the second uplink resource allocation information is a plurality of resource blocks.

10. The resource allocating method according to claim 6, wherein the allocation unit of each one of the plurality of resource block groups corresponds to system bandwidth.

11. A base station comprising:
a transmitter configured to transmit a downlink control signal comprising type information indicating one of:
a first uplink resource allocation type for allocating one or more consecutive resource blocks, and
a second uplink resource allocation type for allocating a plurality of resource block groups, each one of the plurality of resource block groups including a plurality of consecutive resource blocks;
wherein the transmitter is further configured to transmit:
first uplink resource allocation information indicating the one or more consecutive resource blocks, if the type information indicates the first uplink resource allocation type, and
second uplink resource allocation information indicating the plurality of resource block groups, if the type information indicates the second uplink resource allocation type; and
a receiver configured to receive:
first uplink data using the one or more consecutive resource blocks if the type information indicates the first uplink resource allocation type, and
second uplink data using the plurality of resource block groups if the type information indicates the second uplink resource allocation type,
wherein an allocation unit of the one or more consecutive resource blocks indicated by the first uplink resource allocation information is smaller than an allocation unit of each one of the plurality of resource block groups indicated by the second uplink resource allocation information,
wherein at least one resource block, which is not included in the plurality of resource block groups is located between each two of the plurality of resource block groups.

12. The base station according to claim 11, wherein a number of resource blocks included in a first resource block group of the plurality of resource block groups is equal to a number of resource blocks included in a second resource block group of the plurality of resource block groups.

13. The base station according to claim 11, wherein a number of resource blocks included in a first resource block group of the plurality of resource block groups is different from a number of resource blocks included in a second resource block group of the plurality of resource block groups.

14. The base station according to claim 11, wherein the allocation unit of the one or more consecutive resource blocks indicated by the first uplink resource allocation information is one resource block and the allocation unit of each one of the plurality of resource block groups indicated by the second uplink resource allocation information is a plurality of resource blocks.

15. The base station according to claim 11, wherein the allocation unit of each one of the plurality of resource block groups corresponds to system bandwidth.

16. A user equipment comprising:
a receiver configured to receive a downlink control signal comprising type information indicating one of:
a first uplink resource allocation type for allocating one or more consecutive resource blocks, and
a second uplink resource allocation type for allocating a plurality of resource block groups, each one of the plurality of resource block groups including a plurality of consecutive resource blocks;
wherein the receiver is further configured to receive:
first uplink resource allocation information indicating the one or more consecutive resource blocks if the type information indicates the first uplink resource allocation type, and
second uplink resource allocation information indicating the plurality of resource block groups if the type information indicates the second uplink resource allocation type; and
a transmitter configured to transmit:
first uplink data using the one or more consecutive resource blocks if the type information indicates the first uplink resource allocation type, and
second uplink data using the plurality of resource block groups if the type information indicates the second uplink resource allocation type;
wherein an allocation unit of the one or more consecutive resource blocks indicated by the first uplink resource allocation information is smaller than an allocation unit of each one of the plurality of resource block groups indicated by the second uplink resource allocation information,
wherein at least one resource block, which is not included in the plurality of resource block groups is located between each two of the plurality of resource block groups.

17. The user equipment according to claim 16, wherein a number of resource blocks included in a first resource block group of the plurality of resource block groups is equal to a number of resource blocks included in a second resource block group of the plurality of resource block groups.

18. The user equipment according to claim 16, wherein a number of resource blocks included in a first resource block group of the plurality of resource block groups is different from a number of resource blocks included in a second resource block group of the plurality of resource block groups.

19. The user equipment according to claim 16, wherein the allocation unit of the one or more consecutive resource blocks indicated by the first uplink resource allocation information is one resource block and the allocation unit of each one of the plurality of resource block groups indicated by the second uplink resource allocation information is a plurality of resource blocks.

20. The user equipment according to claim 16, wherein the allocation unit of each one of the plurality of resource block groups corresponds to system bandwidth.

* * * * *

UNITED STATES PATENT AND TRADEMARK OFFICE
CERTIFICATE OF CORRECTION

PATENT NO. : 9,668,256 B2  
APPLICATION NO. : 15/132569  
DATED : May 30, 2017  
INVENTOR(S) : Kenji Koyanagi et al.

Page 1 of 1

It is certified that error appears in the above-identified patent and that said Letters Patent is hereby corrected as shown below:

In the Specification

Column 7, Line 52:
"RIV" has been replaced with --$RIV_n$--

Column 8, Line 23:
After "$S_{DRSB}$", delete "and DRSB"

Column 24, Line 21:
"$S_{UDCU}$" has been replaced with --$S_{USCU}$--

Signed and Sealed this  
Twenty-second Day of May, 2018

Andrei Iancu  
*Director of the United States Patent and Trademark Office*